(12) United States Patent
Kosaka et al.

(10) Patent No.: US 8,421,908 B2
(45) Date of Patent: Apr. 16, 2013

(54) ACTUATOR, DRIVE DEVICE, AND IMAGING DEVICE

(75) Inventors: Akira Kosaka, Yao (JP); Yasutaka Tanimura, Okazaki (JP); Takashi Matsuo, Suita (JP); Natsuki Yamamoto, Kawasaki (JP)

(73) Assignee: Konica Minolta Opto, Inc., Tokyo (JP)

( * ) Notice: Subject to any disclaimer, the term of this patent is extended or adjusted under 35 U.S.C. 154(b) by 17 days.

(21) Appl. No.: 13/260,557

(22) PCT Filed: Mar. 16, 2010

(86) PCT No.: PCT/JP2010/054434
§ 371 (c)(1),
(2), (4) Date: Sep. 26, 2011

(87) PCT Pub. No.: WO2010/110122
PCT Pub. Date: Sep. 30, 2010

(65) Prior Publication Data
US 2012/0026387 A1    Feb. 2, 2012

(30) Foreign Application Priority Data
Mar. 25, 2009   (JP) .................................. 2009-074102

(51) Int. Cl.
| | |
|---|---|
| H04N 5/232 | (2006.01) |
| H04N 5/228 | (2006.01) |
| G03B 15/00 | (2006.01) |
| G03B 17/00 | (2006.01) |
| H01L 21/00 | (2006.01) |

(52) U.S. Cl.
USPC ........ 348/357; 348/208.99; 348/345; 396/52; 438/64

(58) Field of Classification Search .................. 348/373, 348/360, 357, 342, 208.99; 438/64, 69; 257/433; 250/234; 396/52–55; 359/554–557
See application file for complete search history.

(56) References Cited

U.S. PATENT DOCUMENTS
| | | | |
|---|---|---|---|
| 6,516,146 B1* | 2/2003 | Kosaka ........................... 396/55 |
| 7,295,770 B2* | 11/2007 | Uenaka et al. .................. 396/55 |
| 7,823,383 B2* | 11/2010 | Noda et al. ..................... 60/528 |
| 8,068,167 B2* | 11/2011 | Honda et al. .................. 348/357 |
| 2008/0278030 A1 | 11/2008 | Hara et al. |
| 2009/0009656 A1 | 1/2009 | Honda et al. |

FOREIGN PATENT DOCUMENTS
| | | |
|---|---|---|
| JP | 60-195386 | 10/1985 |
| JP | 2008-274898 A | 11/2008 |
| JP | 2009-13891 | 1/2009 |

\* cited by examiner

Primary Examiner — Aung S Moe
Assistant Examiner — Mekonnen Dagnew
(74) Attorney, Agent, or Firm — Cozen O'Connor

(57) ABSTRACT

An object of the present invention is to provide an actuator allowing a control of displacement and configured to offer a high degree of freedom in designing, and a drive device and an imaging device including the actuator. To achieve the object, an actuator is adopted including a movable part deformable in accordance with heat generation and a control section controlling the amount of deformation of the movable part. In the actuator, the movable part is structured with a plurality of portions including a base portion, a force generating portion, and a heat generating portion being stacked, the force generating portion generating force in accordance with heating, the heat generating portion generating heat in accordance with a current supply. The control section controls the amount of deformation of the movable part by controlling the current supply to the heat generating portion based on an electrical resistance in the heat generating portion.

6 Claims, 16 Drawing Sheets

F I G. 1 8
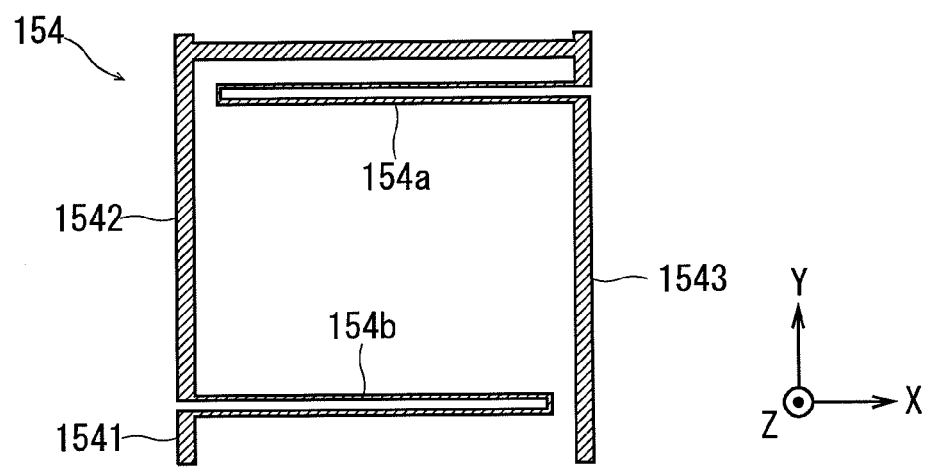
F I G. 1 9
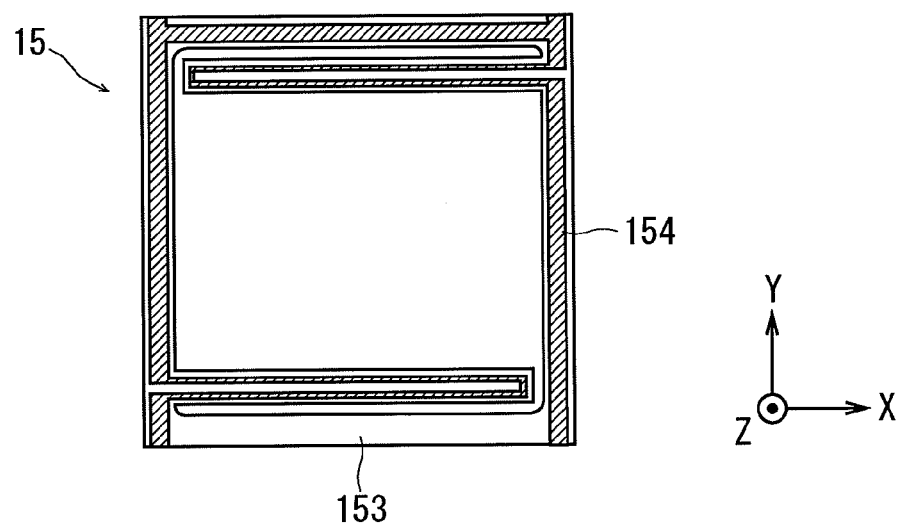

F I G. 2 8
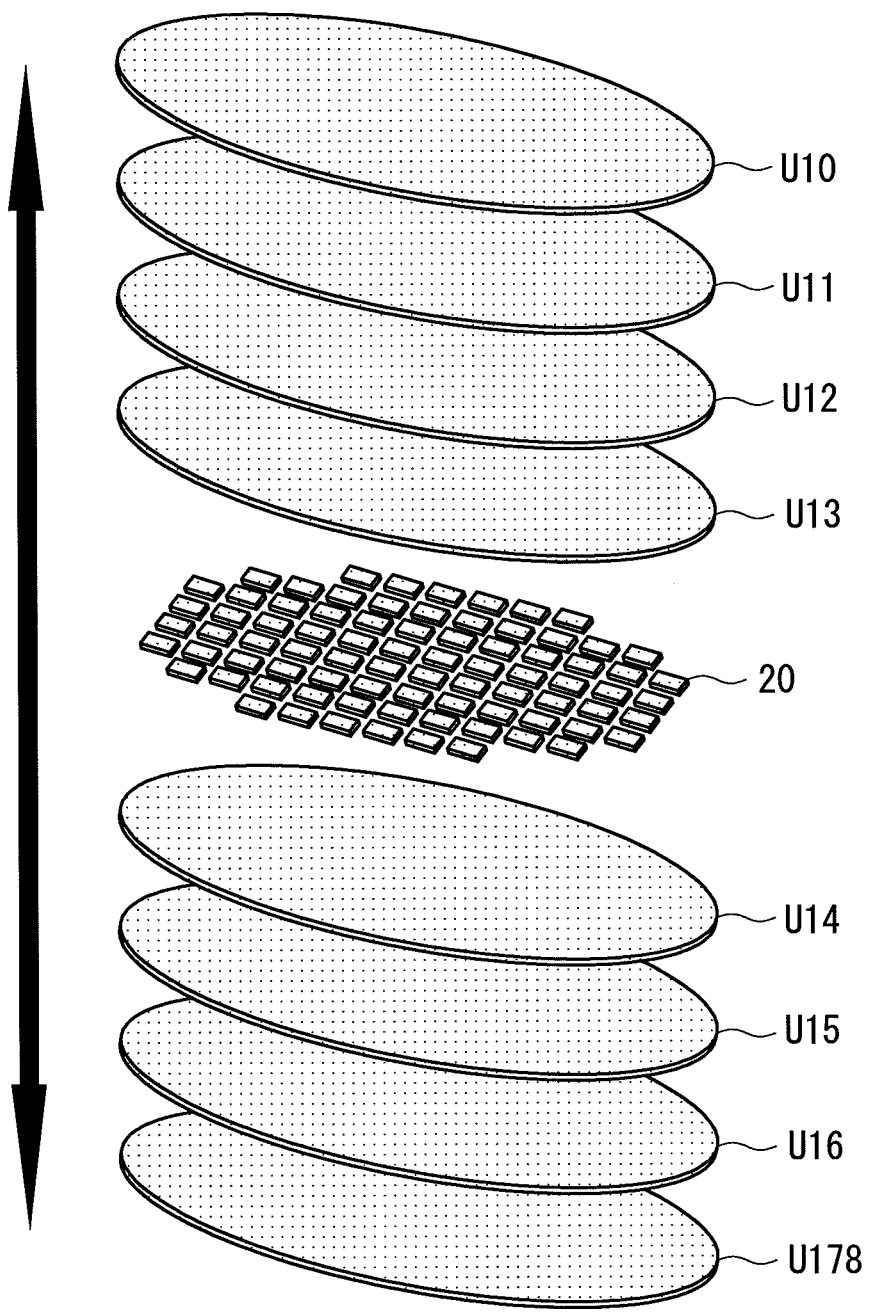

F I G. 2 9
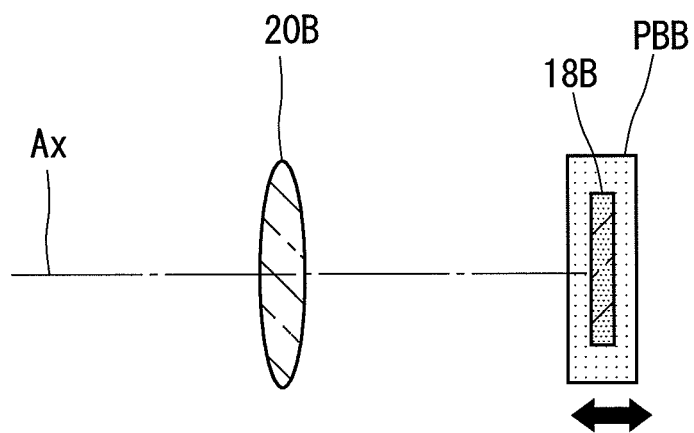

ACTUATOR, DRIVE DEVICE, AND IMAGING DEVICE

RELATED APPLICATIONS

This application is a U.S. National Phase Application under 35 USC 371 of International Application PCT/JP2010/054434 filed Mar. 16, 2010

This application claims the priority of Japanese application No. 2008-074102 filed Mar. 25, 2009, the entire content of which is hereby incorporated by reference.

TECHNICAL FIELD

The present invention relates to an actuator, and a drive device and an imaging device including the actuator.

BACKGROUND ART

In recent years, in a portable electronic device typified by a mobile phone, a digital camera is provided as a standard function. More and more downsizing and weight reduction are constantly required of such a portable electronic device, which inevitably requires downsizing and weight reduction of a camera module. However, in the camera module installed in the portable electronic device, there is a demand for enhancement of functions including an auto-focus function, a camera shake correction function, and the like.

For this improvement of the functions of the camera module, an actuator for driving an optical system and a mechanical structure is essential. Therefore, an actuator that allows improved functions while satisfying the demand for downsizing and weight reduction is required.

For such a demand, an actuator adopting a shape-memory alloy is attracting attentions. In the actuator adopting the shape-memory alloy, the shape-memory alloy is electrically heated to be thereby expanded and contracted, thus causing a displacement. A technique is proposed in which the displacement is indirectly detected based on a detection of a change of a resistance value caused by a deformation of the shape-memory alloy, so that the displacement of the actuator can be freely controlled (for example, Patent Document 1).

PRIOR-ART DOCUMENTS

Patent Documents

Patent Document 1: Japanese Patent Application Laid-Open No. 2008-274898

SUMMARY OF THE INVENTION

Problems to be Solved by the Invention

However, in the technique of the Patent Document 1 mentioned above, the deformation of the shape-memory alloy influences both the change of the resistance value of the shape-memory alloy and the displacement of the actuator. Therefore, an attempt to give a desired driving force to the actuator results in a limitation of the size of the shape-memory alloy. In other words, the size, the resistance value, and the like, of the shape-memory alloy depend on output characteristics such as a driving force and a displacement desired of the actuator. Thus, the degree of freedom in designing the actuator is considerably limitation. This problem may be a very great hindrance to the downsizing and weight reduction of the actuator.

The present invention is made in view of the problems mentioned above, and an object of the present invention is to provide an actuator allowing a control of displacement and configured to offer a high degree of freedom in designing, and a drive device and an imaging device including the actuator.

Means for Solving the Problems

To solve the problems mentioned above, an actuator according to a first aspect includes a movable part deformable in accordance with heat generation, and a control section controlling the amount of deformation of the movable part. In the actuator, the movable part is structured with a plurality of portions including a base portion, a force generating portion, and a heat generating portion being stacked, the force generating portion generating force in accordance with heating, the heat generating portion generating heat in accordance with a current supply, the force generating portion generating force in accordance with heating of the force generating portion due to heat generation of the heat generating portion which is caused in accordance with the current supply to the heat generating portion, so that the generated force causes deformation of the base portion, the force generating portion, and the heat generating portion to thereby deform the movable part. An electrical resistance in the heat generating portion changes in accordance with deformation of the heat generating portion. The control section controls the amount of deformation of the movable part by detecting the amount of deformation of the movable part based on the electrical resistance in the heat generating portion and making a control so as to supply to the heat generating portion a current necessary for obtaining a desired amount of deformation based on a result of the detection of the amount of deformation.

In an actuator according to a second aspect based on the actuator according to the first aspect, the heat generating portion is provided in at least one of a first region and a second region, the first region being located between the base portion and the force generating portion, the second region being located at a side opposite to a side where the base portion exists relative to the force generating portion In an actuator according to a third aspect based on the actuator according to the first aspect, the force generating portion contains a shape-memory alloy.

In an actuator according to a fourth aspect based on the actuator according to the first aspect, the force generating portion has a higher coefficient of thermal expansion than a coefficient of thermal expansion of the base portion.

A drive device according to a fifth aspect includes the actuator according to the first aspect, and a moving object to be moved by the deformation of the movable part.

An imaging device according to a sixth aspect includes the actuator according to the first aspect, an image-pickup element, and an optical system guiding a light from a photographic subject to the image-pickup element. In the imaging device, at least one of the image-pickup element and the optical system is moved by the deformation of the movable part Effects of the Invention In the actuator according to the first aspect, the portion generating force in accordance with heating and the portion generating heat are separately provided, and therefore an actuator allowing a control of the displacement and configured to offer a high degree of freedom in designing can be provided.

In the actuator according to the second aspect, a sufficient amount of deformation of the heat generating portion and a sufficient amount of change in the electrical resistance occur relative to the amount of deformation of the movable part, thus allowing a highly accurate control of the amount of deformation of the movable part.

In the actuator according to the third aspect, the movable part is largely deformed in response to a current application, thus enabling the movable part to be efficiently deformed.

In the actuator according to the fourth aspect, a manufacturing cost can be reduced.

In the drive device according to the fifth aspect, a drive device can be achieved that includes an actuator allowing a control of displacement and configured to offer a high degree of freedom in designing.

In the imaging device according to the sixth aspect, an imaging device can be achieved that includes an actuator allowing a control of displacement and configured to offer a high degree of freedom in designing.

BRIEF DESCRIPTION OF THE DRAWINGS

FIG. 18 is a diagram showing the shape of a heater layer included in the actuator layer.

FIG. 19 shows an external appearance of an upper surface illustrating a detailed configuration of the actuator layer.

FIG. 28 is a diagram schematically showing prepared sheets and the like being laminated and bonded to one another.

FIG. 29 is a diagram showing a manner of moving an image-pickup element according to a modification of the present invention.

EMBODIMENT FOR CARRYING OUT THE INVENTION

In the following, one embodiment of the present invention will be described with reference to the accompanying drawings.

<(1) Outline Configuration of Mobile Phone>

Figure 1:
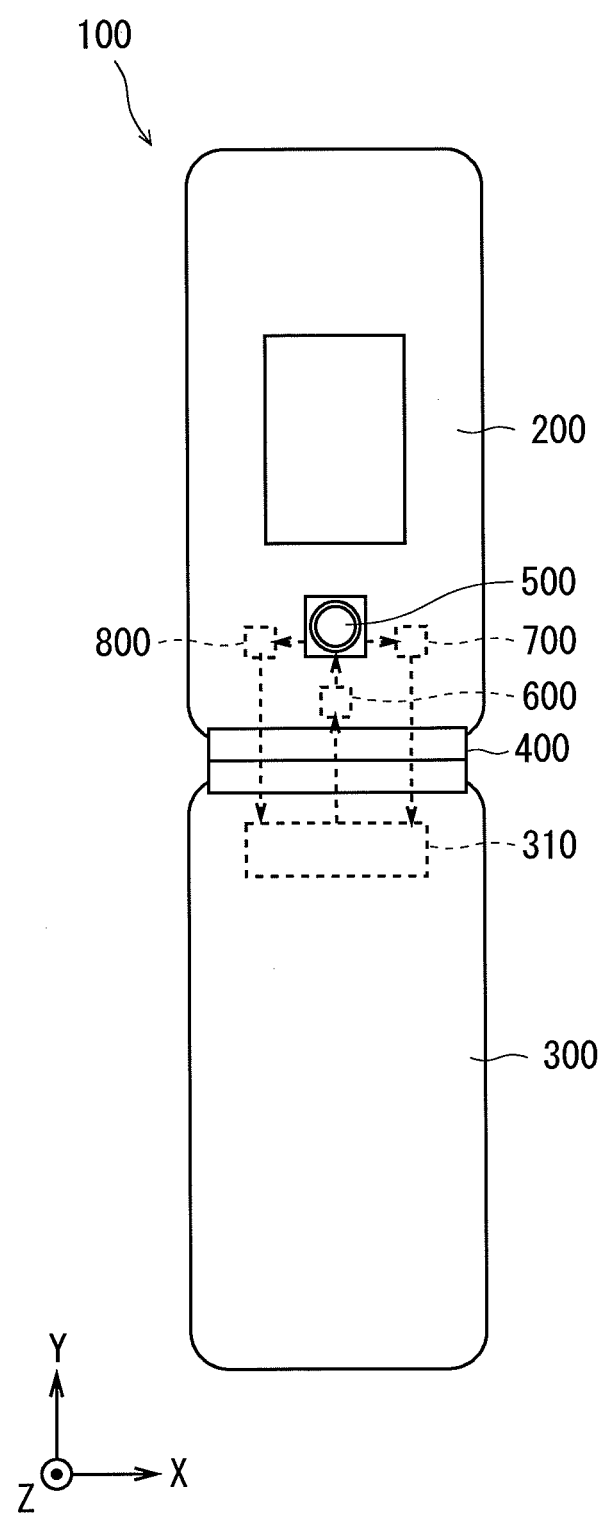
FIG. 1 is a diagram schematically showing an outline configuration of a mobile phone having installed therein a camera module according to one embodiment of the present invention.

FIG. 1 is a diagram schematically showing an outline configuration of a mobile phone 100 having installed therein a camera module 500 according to one embodiment of the present invention. In FIG. 1 and subsequent figures, for clarification of an orientation relationship, three orthogonal X, Y, and Z axes are shown as appropriate.

As shown in FIG. 1, the mobile phone 100 is configured as a flip mobile phone, and includes a first housing 200, a second housing 300, and a hinge part 400. Each of the first housing 200 and the second housing 300 has a substantially rectangular parallelepiped plate-like shape, and functions as a housing for accommodating various electronic members. To be specific, the first housing 200 has the camera module 500 and a display (not shown), and the second housing 300 has a control section for electrically controlling the mobile phone 100 and operation members (not shown) such as buttons. The hinge part 400 connects the first housing 200 to the second housing 300 in a rotatable manner. Thus, the mobile phone 100 is foldable.

In the first housing 200, a current supply driver 600, an electrical resistance detection section 700, and a contrast detection section 800 are installed. The current supply driver 600 controls a current supply to a heater layer 154 (FIG. 18) of the camera module 500. The electrical resistance detection section 700 detects an electrical resistance in the heater layer 154. The contrast detection section 700 detects a contrast with respect to an image signal obtained by an image-pickup element 181 (FIG. 3) of the camera module 500. In the second housing 300, a focusing control section 310 is installed. The focusing control section 310 controls the amount of the current supply to the heater layer 154 via the current supply driver 600 in accordance with signal inputs from the electrical resistance detection section 700 and the contrast detection section 800, and thereby performs an auto-focus control for adjusting a focus state of the camera module 500. The auto-focus control will be described later.

Figure 2:
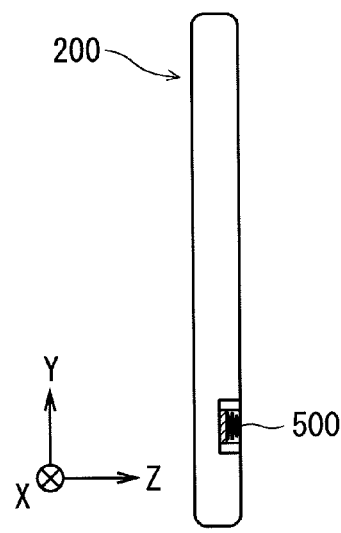
FIG. 2 is a schematic cross-sectional view focusing on a first housing according to the one embodiment of the present invention.

FIG. 2 is a schematic cross-sectional view focusing the first housing 200 of the mobile phone 100. As shown in FIGS. 1 and 2, the camera module 500 is a small imaging device, so-called micro camera unit (MCU), having a size of about 5 mm square in a XY cross-section, and having a thickness (depth in the Z direction) of about 3 mm.

Hereinafter, a configuration of the camera module 500, the auto-focus control in the camera module 500, and a manufacturing process of the camera module 500 will be sequentially described.

<(2) Configuration of Camera Module>

Figure 3:
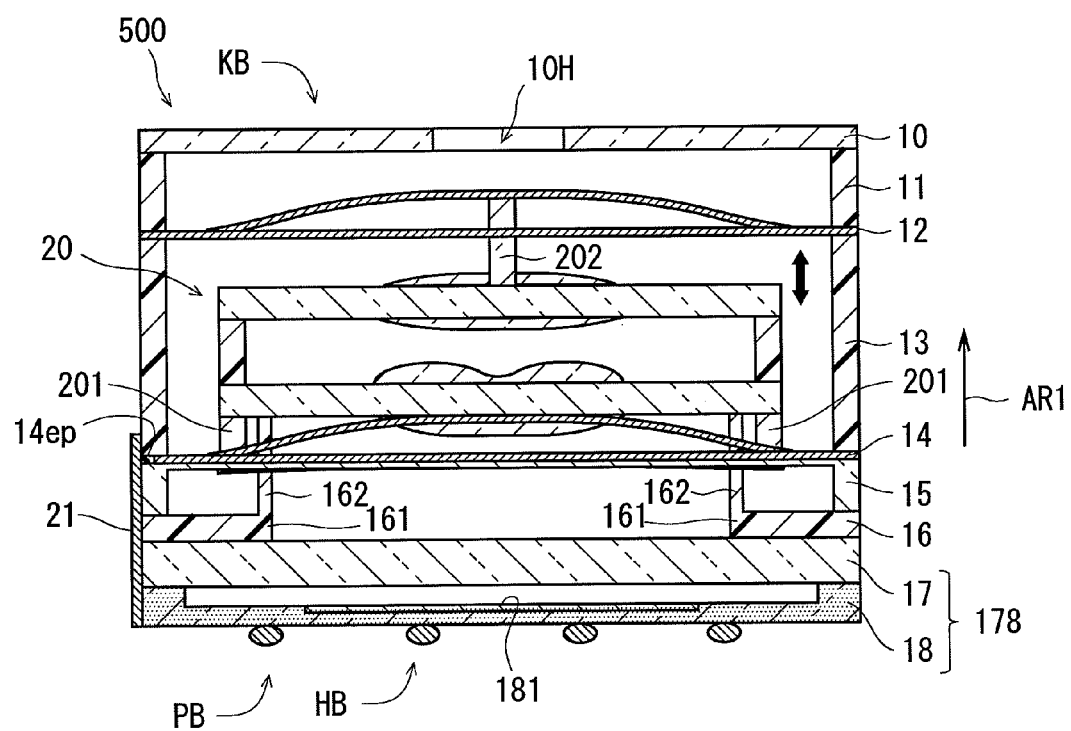
FIG. 3 is schematic cross-sectional view of the camera module according to the one embodiment of the present invention.
Figure 4:
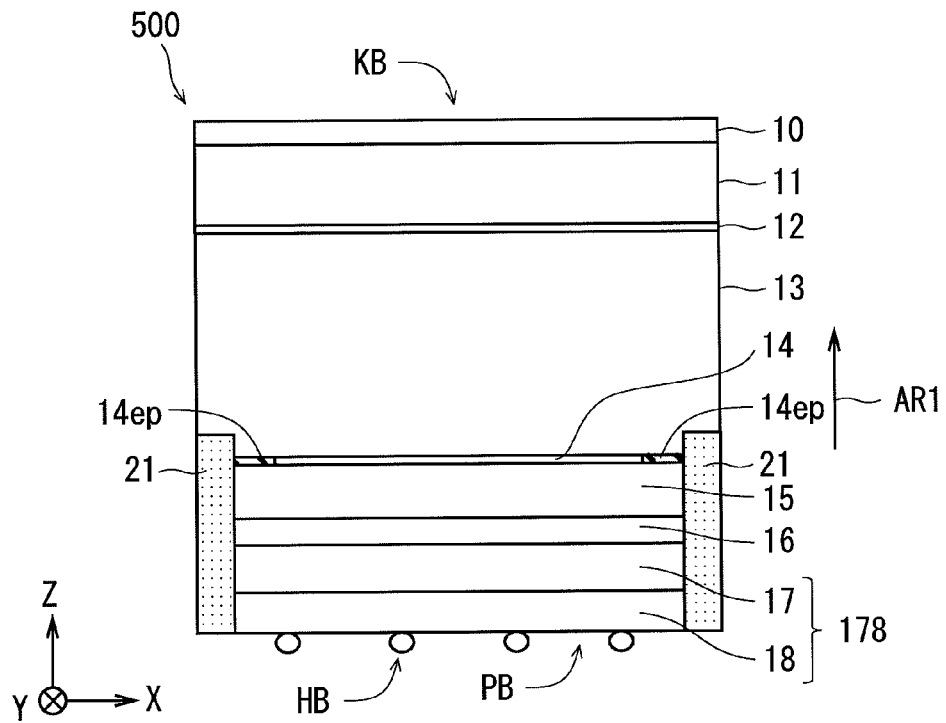
FIG. 4 shows an external appearance of the camera module according to the one embodiment of the present invention, as seen from the lateral side thereof.
Figure 5:
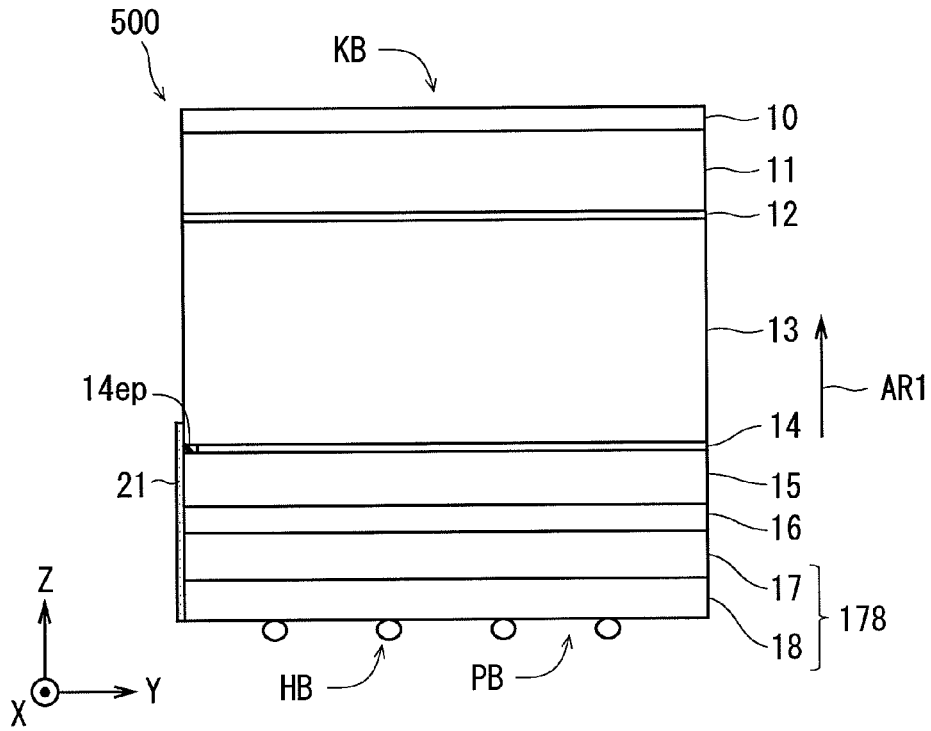
FIG. 5 shows an external appearance of the camera module according to the one embodiment of the present invention, as seen from the lateral side thereof.

FIG. 3 is a schematic cross-sectional view of the camera module 500, and a direction indicated by an arrow AR1 in FIG. 3 corresponds to the +Z direction. In FIG. 3 and subsequent figures, for clarification of the orientation relationship, the arrow AR1 indicating the direction corresponding to the +Z direction is also shown as appropriate. FIGS. 4 and 5 are side views of the camera module 500 as seen from the lateral side thereof.

As shown in FIG. 3, the camera module 500 includes an optical unit KB in which a lens group 20 serving as an imaging optical system is provided in a movable manner, and an image-pickup part PB for obtaining a captured image concerning a subject image.

The image-pickup part PB has a structure in which, for example, an image-pickup element layer 18 including the image-pickup element 181 such as a COMS sensor or a CCD sensor and a cover glass layer 17 are laminated in the mentioned order in the +Z direction. The cover glass layer 17 may include a filter layer for cutting an infrared ray (IR).

The optical unit KB includes a lid layer 10, a first frame layer 11, a first parallel leaf spring (upper-layer parallel leaf spring) 12, a second frame layer 13, a second parallel leaf spring (lower-layer parallel leaf spring) 14, an actuator layer 15, a lens position adjusting layer 16, and a lens group 20. Each of the lid layer 10, the first frame layer 11, the first parallel leaf spring 12, the second frame layer 13, the second parallel leaf spring 14, the actuator layer 15, the lens position adjusting layer 16, and the lens group 20 is manufactured in a wafer state (wafer level). Manufacturing steps thereof will be described later.

In the optical unit KB, the lens position adjusting layer 16, the actuator layer 15, the second parallel leaf spring 14, the second frame layer 13, the first parallel leaf spring 12, the first frame layer 11, and the lid layer 10 are laminated in the mentioned order in the +Z direction, and the lens group 20 is held between the second parallel leaf spring 14 and the first parallel leaf spring 12. The first parallel leaf spring 12, the second parallel leaf spring 14, and the actuator layer 15 cooperate with one another to move the lens group 20 in a direction along the Z axis.

In the camera module 500, the lid layer 10, the first and second frame layers 11 and 13, the lens position adjusting layer 16, the cover glass layer 17, and the image-pickup element layer 18 serve as a fixing part for fixing the lens group 20. The camera module 500 and the optical unit KB are manufactured in a wafer state (wafer level), and four side surfaces thereof (side surfaces extending in parallel with the Z axis in FIGS. 4 and 5) are cut surfaces formed by dicing. On these cut surfaces, a laminated structure comprising a plurality of layers included in the optical unit KB and the image-pickup part PB is exposed.

The lens group 20 is supported by the first and second parallel leaf springs 12 and 14 coupled to the fixing part. To be more specific, at the −Z side of the lens group 20 (at the side where the image-pickup element 181 is placed), the second parallel leaf spring 14 is arranged between the actuator layer 15 and the lens group 20. At the +Z side of the lens group 20 (at the side where the lid layer 10 is placed), the first parallel leaf spring 12 is arranged between the first frame layer 11 and the lens group 20. Thus, the lens group 20 is interposed between the first parallel leaf spring 12 and the second parallel leaf spring 14. Since the lens group 20 is sandwiched by the first and second parallel leaf springs 12 and 14, the attitude of the lens group 20 is maintained so that an optical axis of the lens group 20 is kept constant regardless of a movement of the lens group 20.

When the lens group 20 that is a moving object moves in the +Z direction, the first and second parallel leaf springs 12 and 14 applies to the lens group 20 force traveling in the direction opposite to a direction (that is, the +Z direction) of movement of the lens group 20. When the lens group 20 moves in the −Z direction, the first and second parallel leaf springs 12 and 14 applies to the lens group 20 force traveling in the direction coincident with a direction (that is, the −Z direction) of movement of the lens group 20.

In an undriven state (such as a resting state before being driven) where the lens group 20 does not move in the +Z direction, an elastic force of the first and second parallel leaf springs 12 and 14 presses the lens group 20 against upper end surfaces of protrusions 162 of the lens position adjusting layer 16, so that the lens group 20 is supported by the lens position adjusting layer 16, too. In this undriven state, the lens group 20 comes to rest while being placed in a predetermined position at the maximum possible −Z side within a range (displaceable range) where the lens group 20 can be displaced along the Z axis.

The predetermined position is, for example, set to such a position that a focal point of the optical unit KB can be positioned on a +Z side surface (hereinafter also referred to as a "imaging surface") of the image-pickup element 181 where a large number of pixel circuits are arranged. The focal point of the optical unit KB referred to herein means a point to which, when a parallel beam enters the optical unit KB from the +Z side, a beam emitted from the optical unit KB is focused.

As described above, in the undriven state, the elastic force of the first and second parallel leaf springs 12 and 14 presses the lens group 20 against the lens position adjusting layer 16. Therefore, even if a high impact is applied to the camera module 500, the attitude of the lens group 20 is maintained.

The actuator layer 15 serving as an actuator comprises movable parts 15a and 15b (FIG. 13) that cause a drive displacement toward the +Z direction, and is arranged at the −Z side of the lens group 20. The movable parts 15a and 15b are in contact with first protrusions 201 of the lens group 20 protruding toward the −Z side, and the drive displacement caused by the movable parts 15a and 15b is transferred to the lens group 20 via the first protrusions 201. That is, the actuator layer 15 moves the lens group 20 that is the moving object in a predetermined direction (here, in the +Z direction). In a situation where the drive displacement of the movable parts 15a and 15b in the +Z direction decreases, the lens group 20 moves to the direction (−Z direction) opposite to the predetermined direction due to the elastic force of the first and second parallel leaf springs 12 and 14.

A side surface wiring 21 is a thin-type conductive member arranged on one of the four side surfaces of the camera module 500. As shown in FIGS. 4 and 5, the side surface wiring 21 electrically connects the heater layer 154 (FIG. 18) to the current supply driver 600 and the electrical resistance detection section 700 via the image-pickup element layer 18. To prevent a short-circuit between the side surface wiring 21 and the second parallel leaf spring 14, an insulating part 14ep is provided between the second parallel leaf spring 14 and the side surface wiring 21.

As described above, in the camera module 500, the lens group 20 that is the moving object is coupled to the first and second parallel leaf springs 12 and 14 positioned so as to be opposed to each other with interposition of the lens group 20 therebetween, and the first and second parallel leaf springs 12 and 14 maintains the attitude of the lens group 20 while elastically deforming in the direction (+Z direction) perpendicular to the lens group 20. The lens group 20 receives the driving force from the movable parts 15a and 15b of the actuator layer 15, and has its position displaced along the Z axis. Accordingly, the optical unit KB provided in the camera module 500 can displace the lens group 20 in an optical axis direction (+Z direction) of the lens group 20, thus causing the camera module 500 to function as a drive device that displaces the lens group 20.

<(2-1) Lens Group>

The lens group 20 is manufactured at wafer level by using a glass substrate as a base material, and formed by, for example, two or more lenses being stacked on one another. This embodiment illustrates a case where the lens group 20 is formed by two optical lenses being stacked. In this embodiment, the lens group 20 functions as an imaging lens that guides a light from a photographic subject to the image-pickup element 181.

Figure 6:
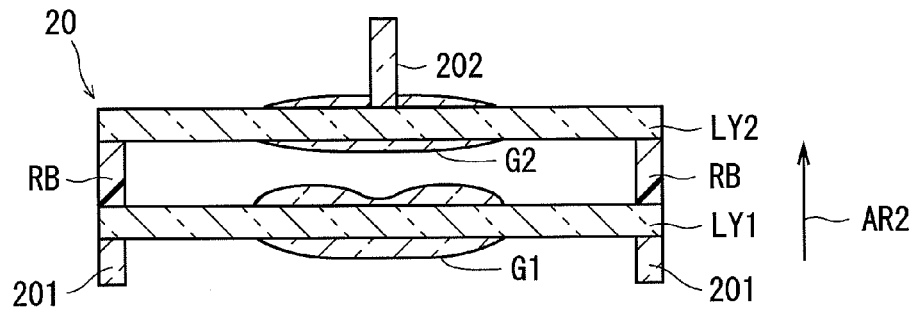
FIG. 6 is a schematic cross-sectional view of a lens group.
Figure 7:
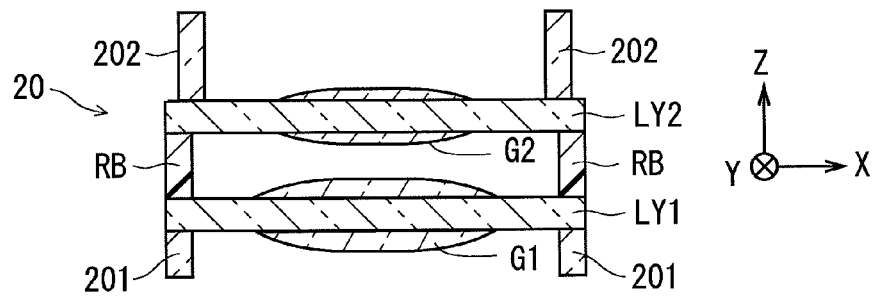
FIG. 7 is a schematic cross-sectional view of the lens group.
Figure 8:
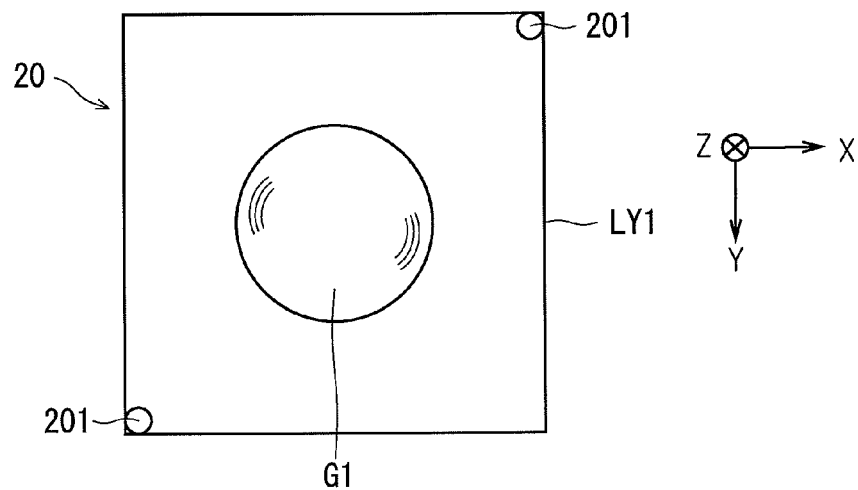
FIG. 8 shows an external appearance of a first lens-forming layer as seen from the lower side thereof.
Figure 9:
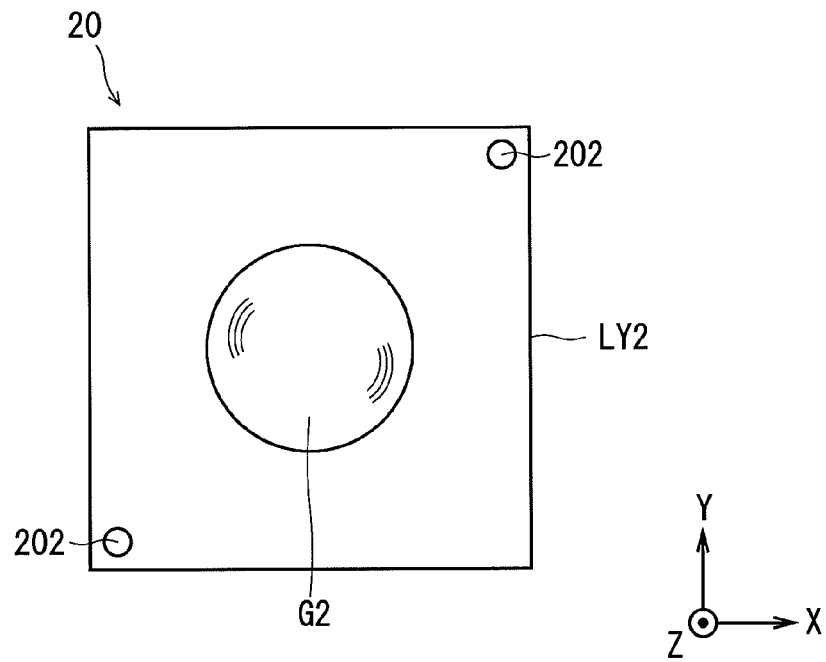
FIG. 9 shows an external appearance of a second lens-forming layer as seen from the upper side thereof.

FIGS. 6 and 7 are schematic cross-sectional views of the lens group 20. A direction indicated by an arrow AR2 corresponds to the +Z direction. FIG. 8 shows an external appearance of a lower surface of the lens group 20 as seen from the lower side (−Z side) of the lens group 20. FIG. 9 shows an external appearance of an upper surface of the lens group 20 as seen from the upper side (+Z side) of the lens group 20.

As shown in FIGS. 6 and 7, the lens group 20 comprises a first lens-forming layer LY1 including a first lens G1, a second lens-forming layer LY2 including a second lens G2, and a spacer layer RB. The first lens-forming layer LY1 and the second lens-forming layer LY2 are coupled to each other with interposition of the spacer layer RB therebetween. Here, in each of the first and second lens-forming layers LY1 and LY2, an outer edge of a non-lens portion has a substantially square shape.

As shown in FIGS. 6 to 8, on one main surface (here, at the −Z side) of the first lens-forming layer LY1 including the first lens G1, the first protrusions 201 are provided in the non-lens portion not functioning as the lens. As shown in FIGS. 6, 7, and 9, on one main surface (here, at the +Z side) of the second lens-forming layer LY2 including the second lens G2, second protrusions 202 is provided in the non-lens portion not functioning as the lens.

Figure 10:
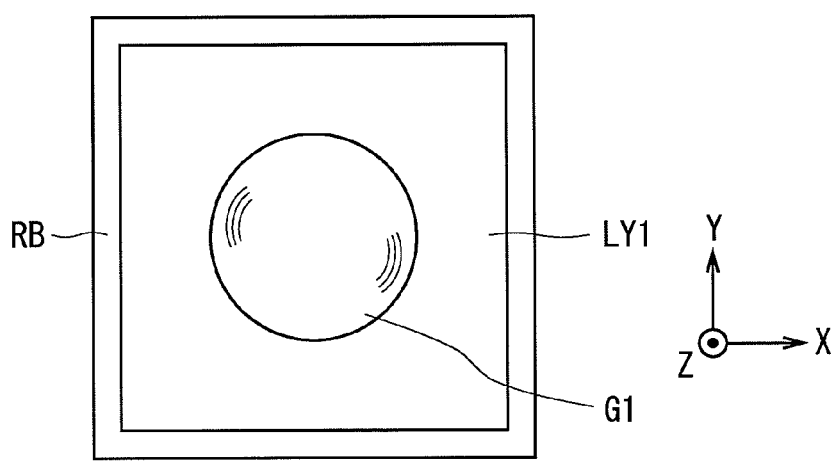
FIG. 10 is a diagram for explaining the shape of a spacer layer.

FIG. 10 shows the spacer layer RB with focus on the shape of the spacer layer RB, as seen from the upper side (+Z side) thereof. As shown in FIG. 10, the spacer layer RB is provided along the outer edges of the non-lens portions of the first and second lens-forming layers LY1 and LY2, and configured such that its outer edge and inner edge have rectangular ring shapes in a XY cross-section. The optical axis of the lens group 20 is set in a direction extending along the Z axis.

<(2-2) Respective Function Layers>

In the following, details of the function layers included in the camera module 500 will be described. In each of the function layers, a −Z side surface will be referred to as one main surface, and a +Z side surface will be referred to as the other main surface.

<(2-2-1) Image-Pickup Element Layer>

As shown in FIG. 3, the image-pickup element layer 18 is a member including the image-pickup element 181 that receives a light from the photographic subject having passed through the optical unit KB and generates an image signal concerning a photographic subject image, a peripheral circuit thereof, and a circumferential portion surrounding the image-pickup element 181. The image-pickup element 181 is formed by a large number of pixel circuits being arranged. Solder balls HB for soldering through a reflow process are formed on one main surface (−Z side surface) of the image-pickup element layer 18. Various terminals to which a wiring for supplying and reading signals to and from the image-pickup element 181 is connected are also formed on one main surface of the image-pickup element layer 18, though not shown here.

<(2-2-2) Cover Glass Layer>

As shown in FIG. 3, the cover glass layer 17 has a substantially flat plate shape, and in a XY cross-section, a substantially square shape, and formed of a transparent glass or the like. The cover glass layer 17 is bonded to the other main surface (+Z side surface) of the image-pickup element layer 18, and functions of protecting the image-pickup element 181. An image-pickup element substrate 178 is formed with the cover glass layer 17 being bonded onto the image-pickup element layer 18.

<(2-2-3) Lens Position Adjusting Layer>

The lens position adjusting layer 16 is formed of a resin material, and arranged between the image-pickup element 181 and the lens group 20. The lens position adjusting layer 16 is a member that adjusts a distance between the image-pickup element 181 and the lens group 20. More specifically, the lens position adjusting layer 16 defines a position (initial position) of the lens group 20 in the undriven state. The lens position adjusting layer 16 is produced by, for example, a method of etching a resin.

Figure 11:
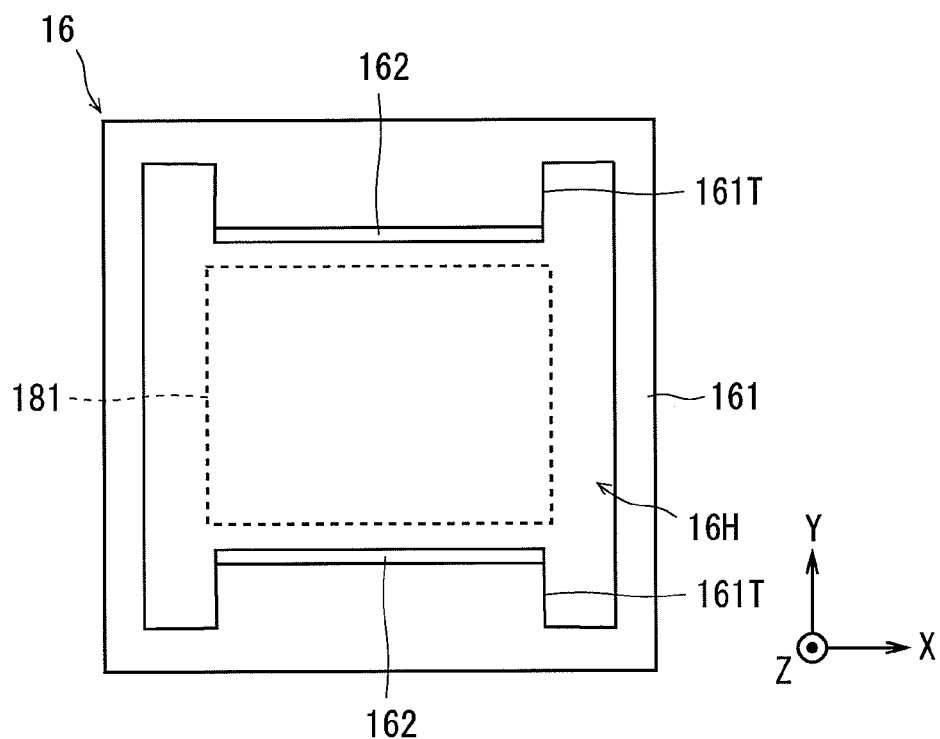
FIG. 11 shows an external appearance of a lens position adjusting layer as seen from the upper side thereof.
Figure 12:
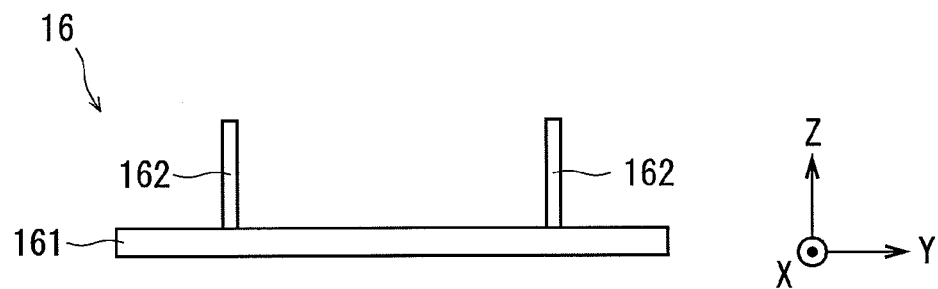
FIG. 12 shows an external appearance of the lens position adjusting layer as seen from the lateral side thereof.

FIG. 11 is a top view of the lens position adjusting layer 16 as seen from the upper side (+Z side) thereof. FIG. 12 is a view of a side surface of the lens position adjusting layer 16 as seen from the lateral side thereof. As shown in FIGS. 11 and 12, the lens position adjusting layer 16 includes a frame body 161 and protrusions 162.

The frame body 161 is a substantially rectangular ring portion that forms a circumferential portion of the lens position adjusting layer 16, and has a plate-like shape extending substantially in parallel to an XY plane. The frame body 161 defines a hole (through hole) 16H extending therethrough in the direction along the Z axis. Each of +Y side and −Y side plate-like members that form the frame body 161 includes a portion (projecting portion) 161T raised toward the through hole 16H side. One main surface of the frame body 161 is bonded to the adjacent cover glass layer 17, and the other main surface of the frame body 161 is bonded to the adjacent actuator layer 15 (and more specifically a frame body 15f (FIG. 13) of the actuator layer 15).

The protrusion 162 is stands upward (toward the +Z direction) in the vicinity of an inner edge of the projecting portion 161T of the frame body 161. The protrusion 162 is a plate-like portion having a board surface that extends substantially in parallel to the XZ plane and has a substantially rectangular shape. A longitudinal direction of the protrusion 162 is a direction substantially in parallel to the X axis, and a transverse direction of the protrusion 162 is a direction substantially in parallel to the Z axis. The lens group 20 is brought into contact with end surfaces of the protrusions 162 at the +Z side, so that the end surfaces have a function of placing the lens group 20 in the initial position.

In FIG. 11, an outer edge of a region (pixel arrangement region) where the plurality of pixel circuits forming the image-pickup element 181 are arranged, that is, a front surface (imaging surface) of the image-pickup element 181 is illustrated with broken lines. As shown in FIG. 11, the imaging surface is configured to satisfy the relationship of (the length of the short side):(the length of the long side):(the length of the diagonal)=3:4:5. The protrusions 162 are arranged at positions that, with respect to a direction in which the pixel arrangement region has the shortest width, sandwiches an optical path extending from the photographic subject through the lens group 20 to the pixel arrangement region of the image-pickup element 181. That is, the protrusions 162 are set so as not to adversely affect shooting and not to increase the size of the apparatus.

<(2-2-4) Actuator Layer>

Figure 13:
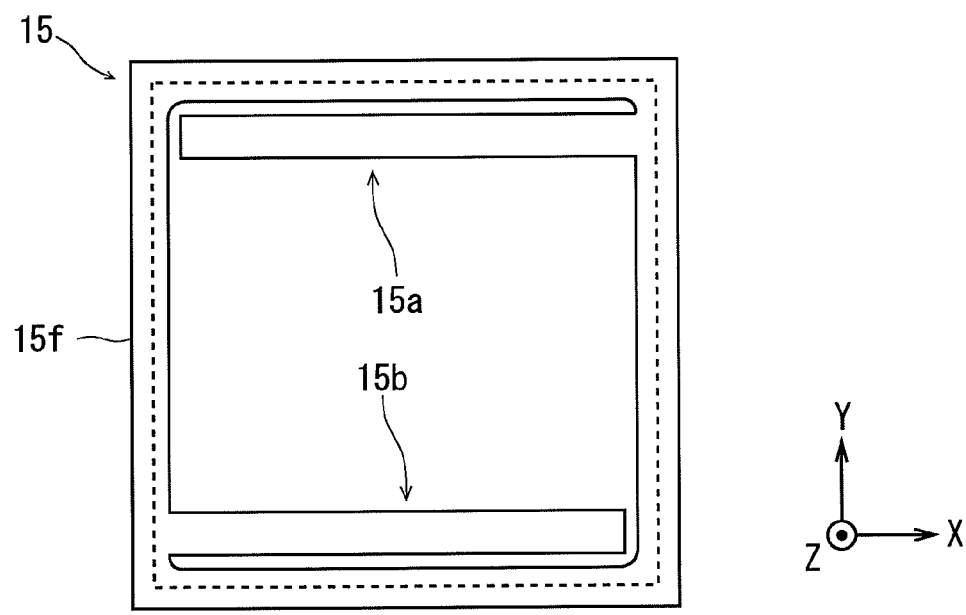
FIG. 13 shows an external appearance of an actuator layer as seen from the upper side thereof.
Figure 14:
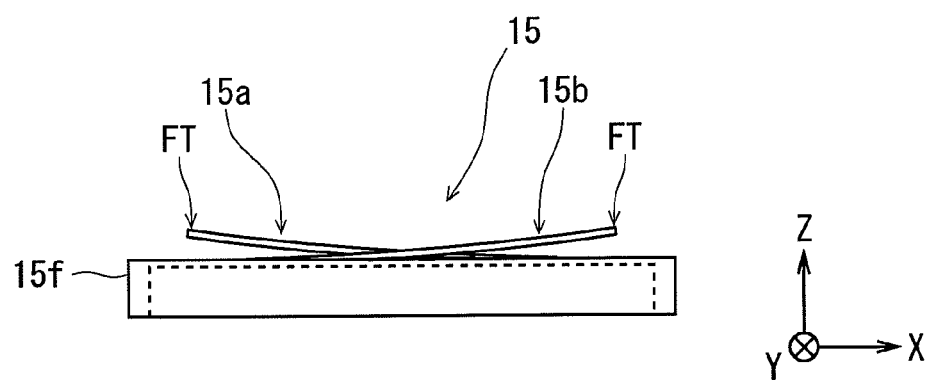
FIG. 14 shows an external appearance of the actuator layer as seen from the lateral side thereof.
Figure 15:
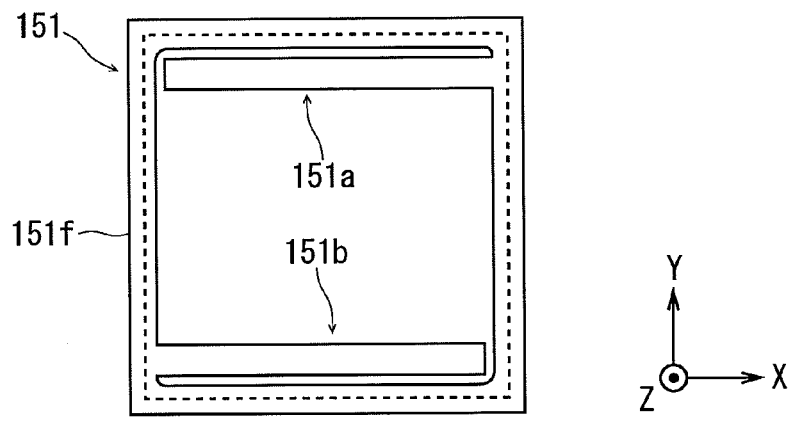
FIG. 15 is a diagram showing the shape of a base layer included in the actuator layer.
Figure 16:
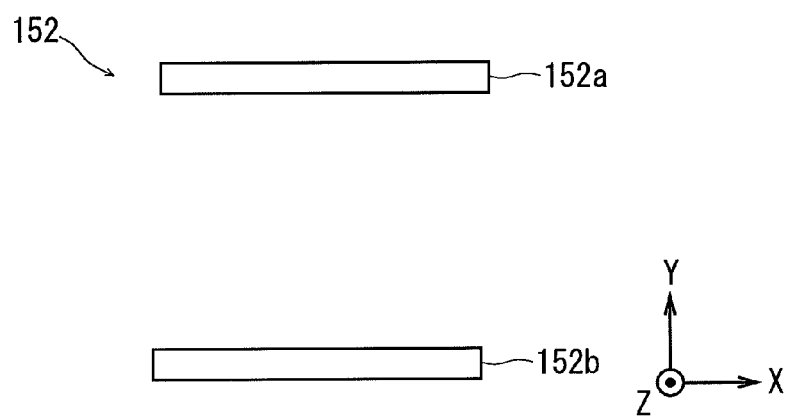
FIG. 16 is a diagram showing the shape of an actuator element layer included in the actuator layer.
Figure 17:
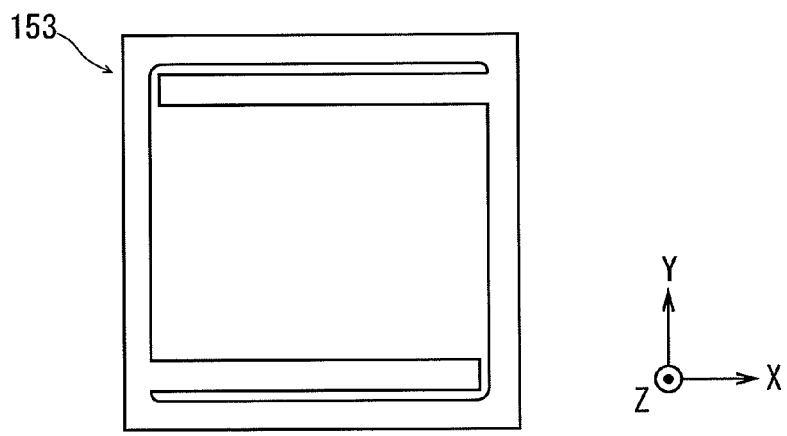
FIG. 17 is a diagram showing the shape of an insulating layer included in the actuator layer.

FIG. 13 is a top view of the actuator layer 15 as seen from the upper side (+Z side) thereof. FIG. 14 is a view of a side surface of the actuator layer 15 as seen from the lateral side thereof. FIGS. 15 to 18 are diagrams showing configurations of layers included in the actuator layer 15.

As shown in FIG. 13, the actuator layer 15 includes a frame body 15*f* forms a circumferential portion, and two plate-like movable parts 15*a* and 15*b* that protrude from the frame body 15*f* into a hollow region inside the frame body 15*f*. The actuator layer 15 is formed by a base layer 151 (FIG. 15), an actuator element layer 152 (FIG. 16), an insulating layer 153 (FIG. 17), and the heater layer 154 (FIG. 18) being laminated to one another in the mentioned order from the −Z side to the +Z side. Preferably, though not shown, an insulating film is formed on an upper surface (+Z side surface) of the heater layer 154, for the purpose of prevention of a short-circuit between the heater layer 154 and the second parallel leaf spring 14.

The base layer 151 includes a base frame body 151*f* forming the frame body 15*f*, and two plate-like protrusions 151*a* and 151*b* that protrude from the base frame body 151*f* into a hollow region inside the base frame body 151*f*. Here, the protrusion 151*a* serving as a base portion forms the movable part 15*a*, and the protrusion 151*b* serving as a base portion forms the movable part 15*b*. The base layer 151 is formed of a material having a low coefficient of thermal expansion, such as silicon.

The actuator element layer 152 includes a force generating portion 152*a* forming the movable part 15*a*, and a force generating portion 152*b* forming the movable part 15*b*. The force generating portions 152*a* and 152*b* are made of a material having different characteristics from those of the base layer 151, and deform in accordance with heating, thus generating a force. In this description, it is assumed that the force generating portions 152*a* and 152*b* is made of a shape-memory alloy (SMA). The force generating portion 152*a* is formed so as to cover the entire area on a +Z side main surface (the other main surface) of the protrusion 151*a* through a sputtering process, a vapor deposition process, or the like. In the same manner, the force generating portion 152*b* is formed so as to cover the entire area on a +Z side main surface (the other main surface) of the protrusion 151*b* through a sputtering process or the like.

The insulating layer 153 is formed of an insulator such as silica (silicon dioxide). The insulating layer 153 is formed so as to cover the entire area on a +Z side main surface (the other main surface) of the base frame body 151*f* and the actuator element layer 152 through a sputtering process, a vapor deposition process, or the like.

The heater layer 154 is made of, for example, a conductive metal having a high resistivity, such as platinum. The heater layer 154 is formed on a +Z side main surface (the other main surface) of the insulating layer 153 through a photolithography technique that is generally used for a semiconductor manufacturing process. As shown in FIG. 18, in the heater layer 154, a wiring portion 1541, a heater portion 154*b*, a wiring portion 1542, a heater portion 154*a*, and a wiring portion 1543 are provided to extend in the mentioned order, and electrically connected sequentially. The wiring portions 1541, 1542, and 1543 form the frame body 15*f*, the heater portion 154*a* forms the movable part 15*a*, and the heater portion 154*b* forms the movable part 15*b*. The wiring portions 1541, 1542, and 1543 are formed so as to have a larger width and therefore a lower electrical resistance than those of the heater portions 154*a* and 154*b*. Accordingly, when a voltage is applied between one end (more specifically, −Y side end surface of the wiring portion 1541) of the heater layer 154 and the other end (−Y side end surface of the wiring portion 1543) thereof, the heater portions 154*a* and 154*b* having a higher electrical resistance generate heat due to the Joule heat of theirselves. That is, the heater portions 154*a* and 154*b* serving as a heat generating portion generate heat in accordance with a current supply.

FIG. 19 is a top view showing a detailed configuration of the actuator layer 15 as seen from the upper side (+Z side) thereof. As shown in FIG. 19, the heater layer 154 is formed on the other main surface (+Z side surface) of the actuator layer 15. In more detail, the heater portion 154*a* extends from one end portion (fixed end) of the movable part 15*a* fixed to the frame body 15*f* to the vicinity of the other end portion (free end) FT of the movable part 15*a*, and is turned back in the vicinity of the free end FT to extend from the vicinity of the free end FT to the fixed end. In the same manner, the heater portion 154*b* extends from one end portion (fixed end) of the movable part 15*b* fixed to the frame body 15*f* to the vicinity of the other end portion (free end) FT of the movable part 15*b*, and is turned back in the vicinity of the free end FT to extend from the vicinity of the free end FT to the fixed end. The one end (and more specifically, the −Y side end surface of the wiring portion 1541) and the other end (the −Y side end surface of the wiring portion 1543) of the heater layer 154 are exposed on the side surface of the camera module 500. A voltage and a current are supplied to one end and the other end of the heater layer 154 through the side surface wiring 21 (FIGS. 3 to 5).

In the actuator layer 15, the movable parts 15*a* and 15*b* are set in a mold having a shape desired to be memorized, and a process (shape-memory process) of heating about at a predetermined temperature (for example, 600° C.) is performed. The SMA of the actuator element layer 152 is, when exceeding a predetermined phase transformation temperature and reaching a predetermined temperature as a result of the heating, given characteristics of restoring a previously memorized predetermined shape (also referred to as a "memory shape"). Here, a warped shape causing the free ends FT of the movable parts 15*a* and 15*b* to displace upward (in the +Z direction) is memorized. As a result, energizing the heater layer 154 to thereby heat the SMA causes the SMA to deform so as to restore the memory shape while contracting, so that the free ends FT of the movable parts 15*a* and 15*b* displace upward (in the +Z direction).

Figure 20:
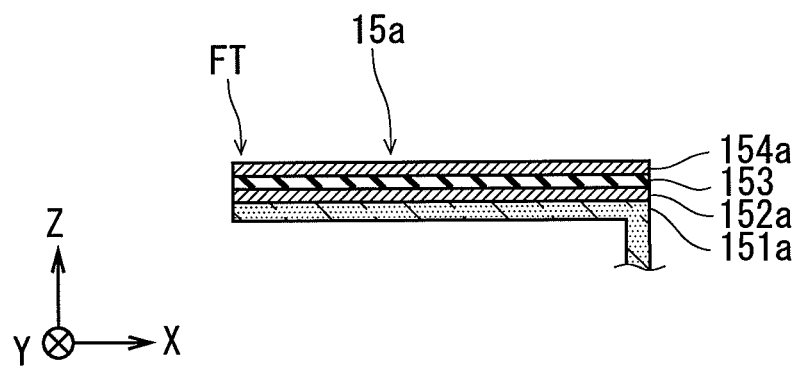
FIG. 20 is a diagram for explaining an exemplary operation of a movable part.
Figure 21:
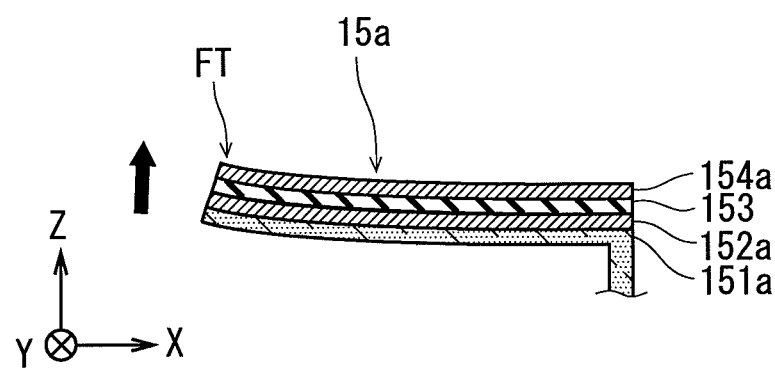
FIG. 21 is a diagram for explaining the exemplary operation of the movable part.

FIGS. 20 and 21 are diagrams schematically showing a manner of deformation of the movable parts 15*a* and 15*b* in accordance with the heat generation in the heater portions 154*a* and 154*b*. Since the manner of deformation of the movable part 15*a* is the same as the manner of deformation of the movable part 15*b*, FIGS. 20 and 21 illustrate, as an example, the manner of deformation of the movable part 15*a*. As shown in FIG. 20, while the heater portion 154*a* is generating no heat, the movable part 15*a* has a flat shape. As shown in FIG. 21, when the force generating portion 152*a* deforms in accordance with the heat generation by the heater portion 154*a*, force occurs so that the movable part 15*a* deforms to displace the free end FT upward (in the +Z direction) around the vicinity of the one end (fixed end) fixed to the frame body 15f.

<(2-2-5) Second Parallel Leaf Spring>

Figure 22:
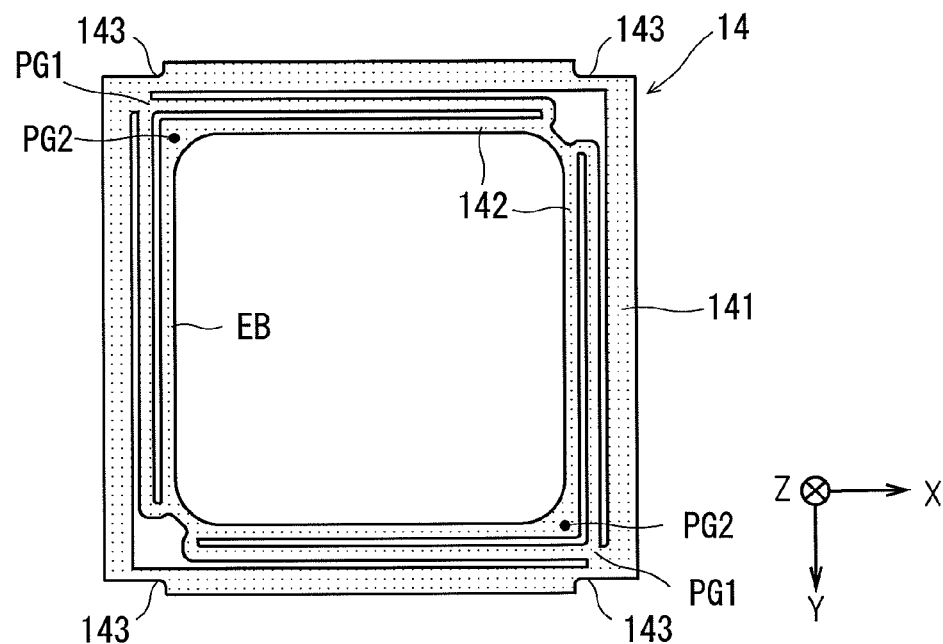
FIG. 22 shows an external appearance of a second parallel leaf spring as seen from the lower side thereof.
Figure 23:
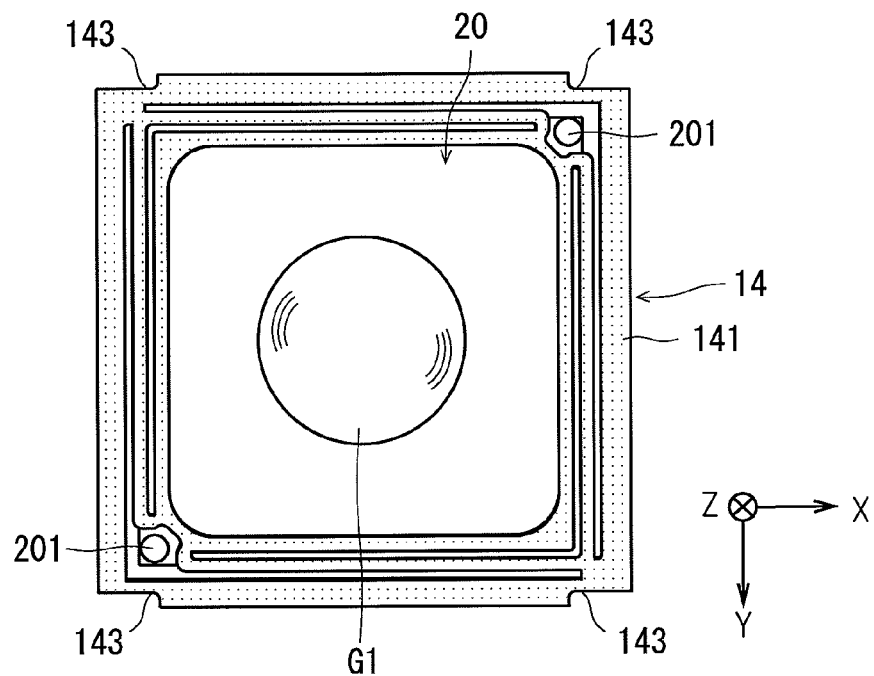
FIG. 23 is a diagram showing the second parallel leaf spring mounted to the lens group.

FIG. 22 shows an external appearance of a lower surface of the second parallel leaf spring 14 as seen from the lower side (−Z side) thereof. FIG. 23 is a diagram showing the second parallel leaf spring 14 bonded to the lens group 20. As shown in FIG. 22, the second parallel leaf spring 14 is an elastic member including a fixed frame body 141 and an elastic portion 142, and configured as a layer (elastic layer) forming a spring mechanism. Examples of the material of the second parallel leaf spring 14 include SUS-based metal material or phosphor bronze.

The fixed frame body 141 forms a circumferential portion of the second parallel leaf spring 14, and is bonded to the frame body 15f of the adjacent actuator layer 15.

Normally, an interval between the heater layer 154 of the actuator layer 15 and the second parallel leaf spring 14 is merely approximately 10 um. Therefore, if the side surface wiring 21 for supplying the voltage and the current to the heater layer 154 is simply provided by, for example, printing so as to extend from the image-pickup element layer 18 to the actuator layer 15, the side surface wiring 21 extends to the fixed frame body 141, too. That is, a short-circuit occurs between the side surface wiring 21 and the second parallel leaf spring 14.

Therefore, for the purpose of prevention of this short-circuit, recessed cutouts 143 are formed in the outer edge near the four corners of the fixed frame body 141 of the second parallel leaf spring 14. When the second frame layer 13 and the second parallel leaf spring 14 are bonded to each other, an adhesive such as an epoxy resin is loaded into the cutouts 143, thus forming the insulating part 14ep (FIGS. 3 and 4). The presence of the insulating part 14ep prevents an unnecessary short-circuit which may otherwise be caused by a contact between the side surface wiring 21 and the second parallel leaf spring 14.

The elastic portion 142 has a connecting portion PG1 connected to the fixed frame body 141 and a bonding portion PG2 bonded to the lens group 20, and the connecting portion PG1 and the bonding portion PG2 are joined to each other by a plate-like member EB. As shown in FIG. 23, the second parallel leaf spring 14 is, in the bonding portion PG2 provided in the elastic portion 142, bonded to the lens group 20. Here, the first protrusions 201 extend through spaces between the fixed frame body 141 of the second parallel leaf spring 14 and the plate-like member EB, and come into contact with the free ends FT of the actuator layer 15. Thus, the second parallel leaf spring 14 is shaped so as not to be in contact with the first protrusions 201 of the lens group 20.

Along with the movement of the lens group 20 in the +Z direction relative to the fixed frame body 141, the position of the connecting portion PG1 and the position of the bonding portion PG2 are misaligned with respect to the Z direction, to cause a bending deformation (deflection deformation) in the plate-like member EB which is therefore bent. That is, the second parallel leaf spring 14 is elastically deformable in the optical axis direction (±Z direction) of the lens group 20 due to an elastic deformation of the plate-like member EB, and functions as a spring mechanism.

The second parallel leaf spring 14 is formed of a SUS-based metal material, phosphor bronze, or the like. For example, in a case of forming the second parallel leaf spring 14 by using a SUS-based metal material, a resist having the shape of a parallel leaf spring is patterned on the metal material by a photolithography technique, and a wet etching process is performed by immersion in an etching solution based on ferric chloride. Thereby, the pattern of the parallel leaf spring is formed.

<(2-2-6) Second Frame Layer>

As shown in FIG. 3, the second frame layer 13 is a ring member whose outer edge and inner edge have substantially rectangular shapes in a XY cross-section, and defines a hollow region extending therethrough along the Z axis. The lens group 20 is arranged in the hollow region, and thereby the second frame layer 13 surrounds the lens group 20 from the lateral side thereof. Examples of the material of the second frame layer 13 include a resin and glass. The second frame layer 13 is prepared using a metal mold by so-called pressing, injection molding, or the like. A lower end surface (one main surface) of the second frame layer 13 positioned at the −Z side thereof is bonded to the fixed frame body 141 of the adjacent second parallel leaf spring 14. An upper end surface (the other main surface) of the second frame layer positioned at the +Z side thereof is bonded to the adjacent first parallel leaf spring 12 (and more specifically, the fixed frame body 121 (FIG. 24) of the first parallel leaf spring 12).

<(2-2-7) First Parallel Leaf Spring>

Figure 24:
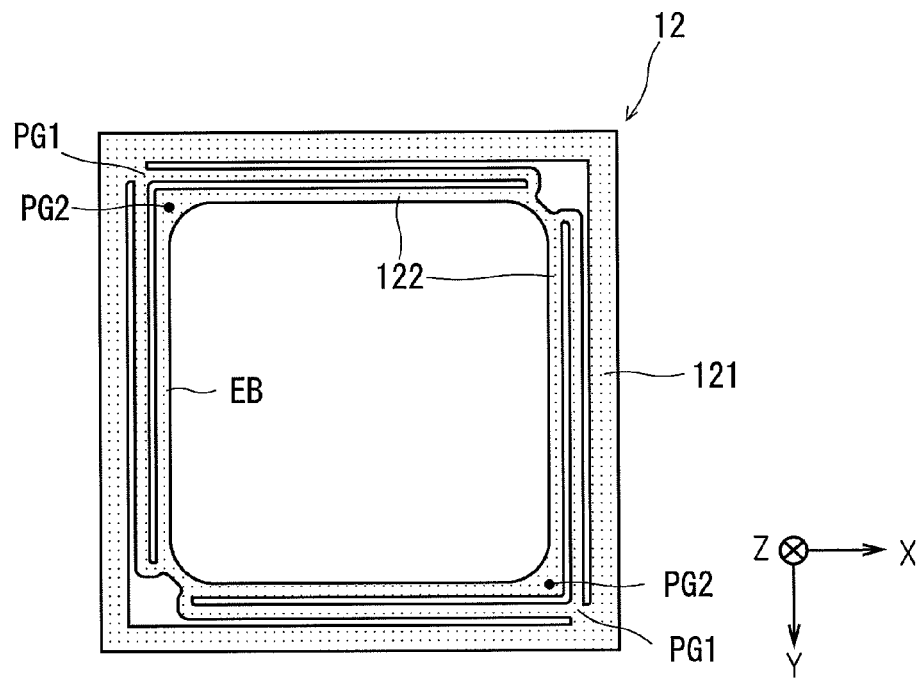
FIG. 24 shows an external appearance of a first parallel leaf spring as seen from the lower side thereof.

FIG. 24 shows a lower external appearance of the first parallel leaf spring 12 as seen from the lower side (−Z side) thereof. As shown in FIG. 24, the first parallel leaf spring 12 is an elastic member having the same configuration and function as those of the second parallel leaf spring 14 except that the cutouts 143 are not formed. The first parallel leaf spring 12 includes a fixed frame body 121 and an elastic portion 122. One main surface of the fixed frame body 121 is bonded to the other main surface of the adjacent second frame layer 13, and the other main surface of the fixed frame body 121 is bonded to the adjacent first frame layer 11 (and more specifically, a lower end surface of the first frame layer 11 at the −Z side thereof)

Figure 25:
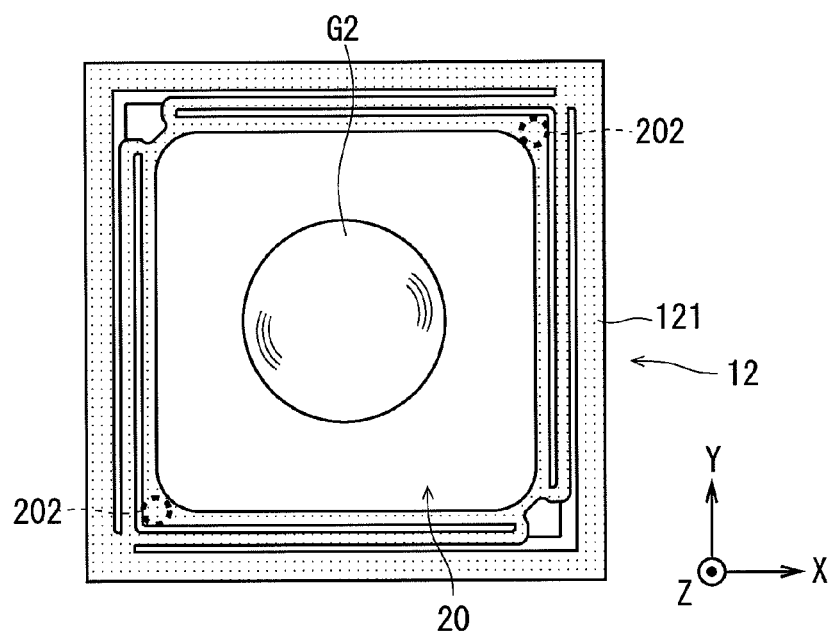
FIG. 25 is a diagram showing the first parallel leaf spring mounted to the lens group.

FIG. 25 is a diagram showing the first parallel leaf spring 12 bonded to the lens group 20. As shown in FIG. 25, the bonding portion PG2 provided in the elastic portion 122 is bonded to an upper end surface of the protrusion 202 of the lens group 20 at the +Z side thereof. As a result, when the lens group 20 is moved in the +Z direction relative to the fixed frame body 121, an elastic deformation occurs in the plate-like member EB, so that the first parallel leaf spring 12 functions as a spring mechanism.

<(2-2-8) First Frame Layer>

As shown in FIG. 3, the first frame layer 11 is, similarly to the second frame layer 13, a ring member whose outer edge and inner edge have substantially rectangular shapes in a XY cross-section, and defines a hollow region extending therethrough along the Z axis. The hollow region of the first frame layer 11 is a space where the plate-like member EB and protrusion 202 that are elastically deformed in the movement of the lens group 20 in the +Z direction can be moved. The first frame layer 11 is formed of the same material and by the same preparation method as those of the second frame layer 13. The lower end surface (one main surface) of the first frame layer 11 positioned at the −Z side thereof is bonded to the fixed frame body 121 of the adjacent first parallel leaf spring 12. An upper end surface (the other end surface) of the first frame layer positioned at the +Z side thereof is bonded to the adjacent lid layer 10 (in more detail, near a circumferential portion of the lid layer).

<(2-2-9) Lid Layer>

As shown in FIG. 3, the lid layer 10 is a plate-like member having a hole (through hole) 10H substantially at the center thereof, and a board surface that extends substantially in parallel to the XY plane. The hole 10H has a substantially square outer edge in a XY cross-section, and extends through the lid layer 10 in a direction parallel to the Z axis. The through hole 10H is a hole for guiding a light from the photographic subject through the lens group 20 to the image-pickup element 181. The lid layer 10 is prepared by forming the through hole 10H by a method of press-processing a flat-plate-like resin material or a method of patterning and then etching a resin material.

In order to prevent dirt and the like from entering the camera module 500 through the through hole 10H of the lid layer 10, a transparent protective layer made of glass or the like is appropriately provided at the upper surface (the other main surface) side of the lid layer 10, though not shown in FIG. 3.

<(3) Auto-Focus Control in Camera Module>

Figure 26:
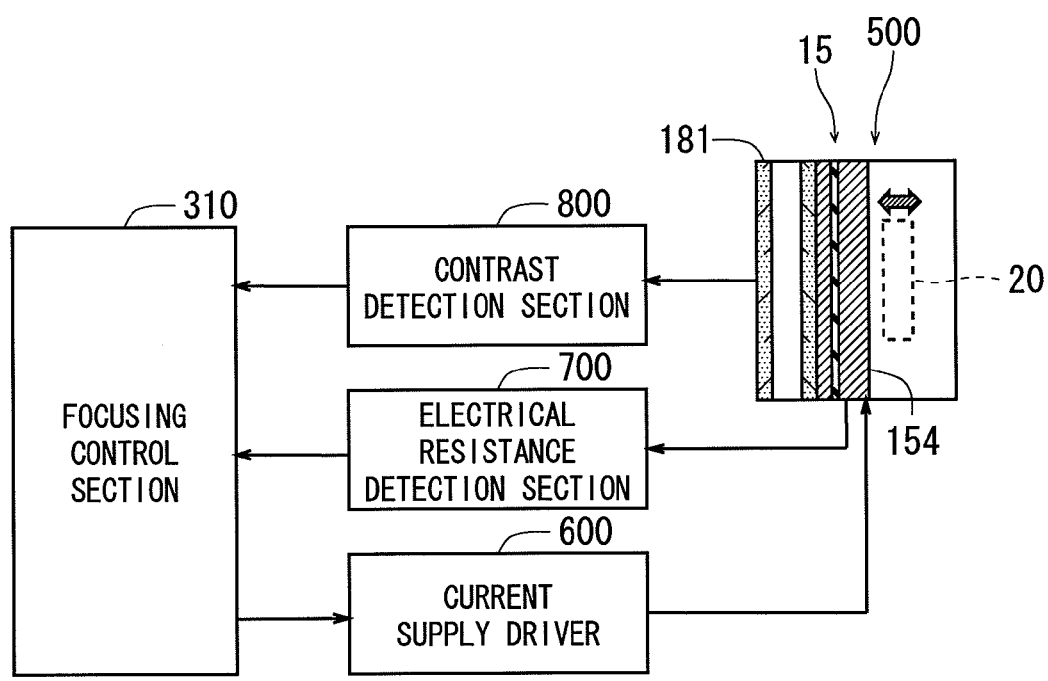
FIG. 26 is a block diagram showing a functional configuration for an auto-focus control.

FIG. 26 is a block diagram showing a functional configuration for an auto-focus control of the camera module 500. The electrical resistance detection section 700 detects an electrical resistance in the heater layer 154, and outputs a signal indicating the electrical resistance to the focusing control section 310. The focusing control section 310 detects a deformation (and more specifically a displacement of the free ends FT) of the movable parts 15a and 15b based on the electrical resistance in the heater layer 154. The detection of the displacement of the free ends FT is made by using the fact that the relationship between the shape of the heater layer 154 (and more specifically the heater portions 154a and 154b) and the electrical resistance is uniquely determined. The focusing control section 310 controls the current supply to the heater layer 154 through the current supply driver 600 while detecting the displacement of the free ends FT, and thereby controls the amount of deformation of the movable parts 15a and 15b, that is the displacement of the free ends FT. At this time, the free ends FT push up the first protrusions 201 so that the lens group 20 moves in the +Z direction, thereby changing the spaced distance between the lens group 20 and the image-pickup element 181 to consequently change the position of the focal point of the optical unit KB.

The contrast detection section 800 detects a contrast with respect to the image signal obtained by the image-pickup element 181. For example, a value obtained as a result of integration of differences in the tone value between adjacent pixels throughout the image is detected as an evaluation value representing the contrast. A signal indicating the evaluation value representing the contrast is outputted to the focusing control section 310.

In performing the auto-focus control, under the control of the focusing control section 310, firstly, the spaced distance between the lens group 20 and the image-pickup element 181 is sequentially set to multi-stage spaced distances that are preset. The image-pickup element 181 obtains an image signal in a state of each of the spaced distances. In other words, the position to which the lens group 20 protrudes in the +Z direction is set to the preset multi-stage positions, and at a time point when the lens group 20 is placed in each of the protruding positions, the image-pickup element 181 obtains the image signal. Here, the focusing control section 310 controls the current supply to the heater layer 154 through the current supply driver 600 while monitoring the electrical resistance in the heater layer 154 detected by the electrical resistance detection section 700, and thereby the protruding position of the lens group 20 is changed.

Then, the focusing control section 310 detects the protruding position providing the maximum evaluation value representing the contrast, based on the evaluation value representing the contrast detected by the contrast detection section 800 with respect to each protruding position. The state where the lens group 20 is placed in this protruding position providing the maximum evaluation value representing the contrast corresponds to a state where the photographic subject is focused to. The focusing control section 310 controls so as to move the lens group 20 to the protruding position providing the maximum evaluation value representing the contrast, so that the focusing to the photographic subject is achieved in the camera module 500. That is, the auto-focus control is achieved.

As described above, in the movable part 15a, the heater portion 154a is provided in a region at the side opposite to the protrusion 151a relative to the force generating portion 152a, while in the movable part 15b, the heater portion 154b is provided in a region at the side opposite to the protrusion 151b relative to the force generating portion 152b. Therefore, when the force generating portions 152a and 152b are deformed into the memory shape while contracting due to the heat generated in the heater portions 154a and 154b so that the free ends FT of the movable parts 15a and 15b are displaced upward, the movable parts 15a and 15b exhibit the minimum deformation in the vicinity of the lower surfaces (−Z side surfaces) of the protrusions 151a and 151b, as shown in FIG. 21.

The heater portions 154a and 154b are spaced apart from the vicinity of the lower surfaces (neutral plane) of the protrusions 151a and 151b, because of the presence of the force generating portions 152a and 152b and the insulating layer 153. Therefore, when the free ends FT of the movable parts 15a and 15b are displaced upward, a relatively large deformation occurs in the heater portions 154a and 154b. As a result, a larger change in the electrical resistance in the heater layer 154 can be obtained relative to the displacement of the free ends FT of the movable parts 15a and 15b. That is, relative to the amount of deformation of the movable parts 15a and 15b, a sufficient amount of deformation of the heater portions 154a and 154b and a sufficient amount of change in the electrical resistance of the heater portions 154a and 154b are obtained. This allows a highly accurate control of the amount of deformation of the movable parts 15a and 15b.

<(4) Manufacturing Process of Camera Module>

Figure 27:
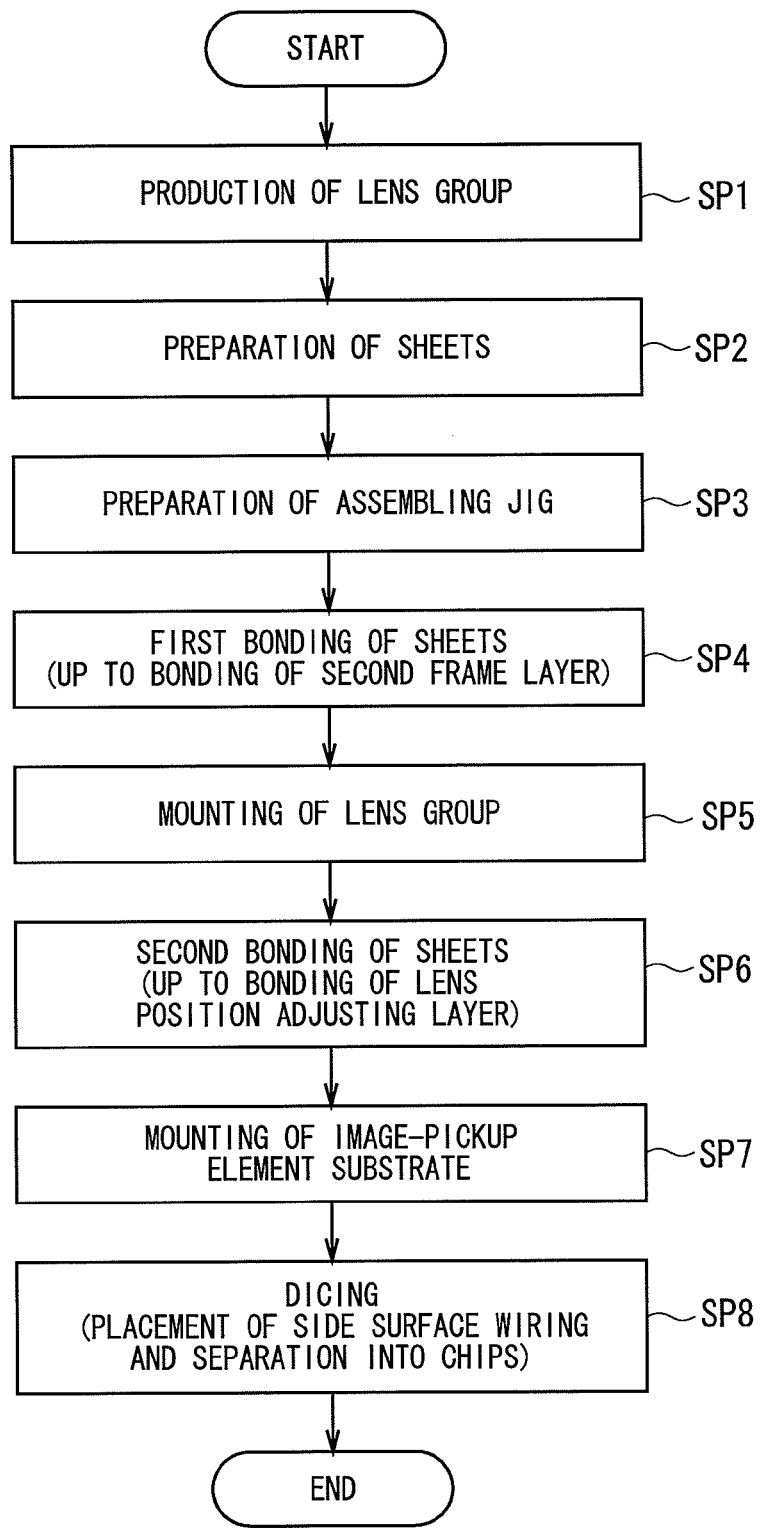
FIG. 27 is a flowchart showing a manufacturing process of the camera module.

The manufacturing process of the camera module 500 will be briefly described here. FIG. 27 is a flowchart showing a manufacturing process of the camera module 500. As shown in FIG. 27, (Process A) production of the lens group 20 (step SP1); (Process B) preparation of sheets (step SP2); (Process C) preparation of assembling jig (step SP3); (Process D) first bonding of the sheets (step SP4); (Process E) mounting of the lens group 20 (step SP5); (Process F) second bonding of the sheets (step SP6); (Process G) mounting of the image-pickup element substrate 178 (step SP7); and (Process H) dicing (step SP8) are sequentially performed, to manufacture the camera module 500.

<(4-1) Production of Lens Group (Process A)>

In step SP1, the lens group 20 is produced. Firstly, a wafer (hereinafter also referred to as a "lens group wafer") is prepared in which a large number of lens groups 20 are arranged in a matrix, and dicing is performed to divide the large number of lens groups 20 into individual pieces, thus preparing the large number of lens groups 20. The lens group wafer is prepared by a wafer (first lens-forming layer wafer) in which a large number of first lens-forming layers LY1 are arranged, a wafer (spacer layer wafer) in which a large number of spacer layers RB are arranged, and a wafer (second lens-forming layer wafer) in which a large number of second lens-forming layers LY2 are arranged being laminated and bonded to one another.

<(4-2) Preparation of Sheets (Process B)>

In step SP2, each of sheets corresponding to the respective function layers included in the camera module 500 is formed. Here, a wafer-level disk-shaped sheet is prepared. In the sheet for each function layer, a large number of chips corresponding to the members of this function layer are formed in a matrix in a predetermined arrangement. More specifically, in step SP2, sheets U10 to U16 and a sheet (image-pickup element substrate sheet) U178 are prepared. In the sheets U10 to U16, a large number of chips corresponding to the respective function layers of the lid layer 10, the first frame layer 11, the first parallel leaf spring 12, the second frame layer 13, the second parallel leaf spring 14, the actuator layer 15, and the lens position adjusting layer 16, are formed in a predetermined arrangement. The sheet U178 includes a chip corresponding to the image-pickup element substrate 178 that is formed by the cover glass layer 17 and the image-pickup element layer 18 being bonded to each other. Thus, eight sheets U10 to U16, and U178 are prepared.

<(4-3) Preparation of Assembling Jig (Process C)>

In step SP3, an assembling jig is prepared. The assembling jig has a large number of protrusions having substantially the same shape and formed in a predetermined arrangement on a flat-plate-like base. In the assembling jig, alignment marks for the positioning purpose are formed at two or more predetermined positions. Upper surfaces of the protrusions are made substantially parallel to a main surface of the flat-plate-like base. On these upper surfaces, a unit corresponding to each camera module 500 is prepared.

<(4-4) First Bonding of Sheet (Process D)>

In step SP4, among the eight sheets U10 to U16 and U178, the three sheets U11 to U13 are bonded to one another. Here, the first frame layer sheet U11, the first parallel leaf spring sheet U12, and the second frame layer sheet U13 are positioned (aligned) while maintaining their sheet shapes such that the chips included in the sheets U11 to U13 can be laminated to one another. Thus, the sheets U11 to U13 are bonded to one another with an adhesive or the like.

FIG. 28 is a schematic diagram collectively showing that the three sheets U11 to U13 are laminated and bonded to one another in step S4, that lens groups 20 are mounted in step S5, that the four sheets U10 and U14 to U16 are laminated and bonded to one another in step S6, and that the image-pickup element substrate sheet U178 is bonded in step SP7.

<(4-5) Mounting of Lens Group (Process E)>

In step SP5, by a predetermined mounter, the lens group 20 produced in step SP1 is mounted in a hollow region of each second frame layer 13 of the unit prepared in step SP4. In other words, the lens group 20 is inserted into each of gaps in the second frame layer sheet U13 having a grid shape. To be specific, the lens group 20 is pressed against the bonding portion PG2, and the end surface of the second protrusion 202 is bonded to the one main surface side of the bonding portion PG2. Examples of the bonding method include a bonding method using an adhesive (ultraviolet curing adhesive) curable by an exposure to ultraviolet radiation.

<(4-6) Second Bonding of Sheets (Process F)>

In step SP6, among the eight sheets U10 to U16, and U178 prepared in step SP2, the four sheets U10, and U14 to U16 are bonded to one another. More specifically, in step SP6, the second parallel leaf spring sheet U14 and the actuator layer sheet U15 are positioned (aligned) while maintaining their sheet shapes with respect to the one main surface side of the unit produced until the step SP5 such that the chips included in the second parallel leaf spring sheet U14 and the actuator layer sheet U15 can be laminated to the chips included in the second frame layer sheet U13. Then, the sheets U14 and U15 are sequentially bonded with an adhesive or the like.

Additionally, the lid layer sheet U10 is positioned (aligned) to the other main surface side of the first frame layer sheet U11 while maintaining its sheet shape such that the chips included in the lid layer sheet U10 can be laminated to the chips included in the first frame layer sheet U11. In this state, the lid layer sheet U10 is bonded to the other main surface side of the first frame layer sheet U11 with an adhesive or the like.

Moreover, the lens position adjusting layer sheet U16 is positioned (aligned) to the one main surface side of the actuator layer sheet U15 while maintaining its sheet shape such that the chips included in the lens position adjusting layer sheet U16 can be laminated to the chips included in the actuator layer sheet U15. In this state, the lens position adjusting layer sheet U16 is bonded to the one main surface side of the actuator layer sheet U15 with an adhesive or the like.

<(4-7) Mounting of Image-Pickup Element Substrate (Process G)>

In step SP7, the other main surface of the image-pickup element substrate sheet U178 is bonded to the one main surface of the lens position adjusting layer sheet U16 such that the circumferential portion of the image-pickup element substrate 178 can be bonded to the frame body 161 of the lens position adjusting layer 16 of the unit obtained by the bonding of the lens position adjusting layer 16 in step SP6.

<(4-8) Dicing (Process H)>

In step SP8, a laminated member obtained as a result of inserting each of the large number of lens groups 20 and laminating the eight sheets U10 to U16, and U178 to one another is protected with a dicing tape or the like, and then separated into chips by a dicing apparatus. Thus, a large number of camera modules 500 are completed. In the course of this dicing process, the side surface wiring 21 is formed. More specifically, at a time point when the dicing in one direction is performed, each heater layer 154 is exposed on a cut surface corresponding to the side surface of each camera module 500. A conductive material for forming the side surface wiring 21 is applied to the cut surface, and then the dicing in the other direction is performed. In this manner, the large number of camera modules 500 are completed.

As described above, in the mobile phone 100 having installed therein the camera module 500 according to one embodiment of the present invention, the force generating portions 152a and 152b that generate force in accordance with heating and the heater portions 154a and 154b that generate heat in accordance with a current supply are separately provided in the actuator layer 15. The displacement of the free ends FT of the movable parts 15a and 15b is controlled based on the current supply to the heater portions 154a and 154b in accordance with the electrical resistance in the heater portions 154a and 154b. This allows a control of the displacement of the movable parts 15a and 15b, and also allows the force generating portions 152a and 152b to be designed separately from the heater portions 154a and 154b. Thus, the actuator layer 15 is achieved allowing a control of the displacement in the movable parts 15a and 15b and configured to offer a high degree of freedom in designing.

Since the force generating portions 152a and 152b are made of a shape-memory alloy, a large deformation occurs in the movable parts 15a and 15b in response to a current application. This can efficiently deform the movable parts 15a and 15b.

<(5) Modification>

The present invention is not limited to the above-described embodiment, and various modifications, improvements, and the like, may be made without departing from the scope of the present invention.

For example, in one embodiment described above, the heater portion 154a is provided in the region at the side opposite to the side where the protrusion 151a exists relative to the force generating portion 152a, while the heater portion 154b is provided in the region at the side opposite to the side where the protrusion 151b exists relative to the force generating portion 152b. However, this is not limitative. For example, the heater portion 154a may be provided in a region between the protrusion 151a and the force generating portion 152a, or the heater portion 154b may be provided in a region between the protrusion 151b and the force generating portion 152b.

However, as the distance between the heater portion 154a and the vicinity of the lower surface of the protrusion 151a increases, the amount of deformation of the heater portion 154a involved in the deformation of the movable part 15a becomes larger, and as the distance between the heater portion 154b and the vicinity of the lower surface of the protrusion 151b increases, the amount of deformation of the heater portion 154b involved in the deformation of the movable part 15b becomes larger. Therefore, from the viewpoint of controlling the amount of deformation of the movable parts 15a and 15b with a high accuracy, it is preferable that the heater portion 154a is distant from the vicinity of the lower surface of the protrusion 151a as much as possible while the heater portion 154b is distant from the vicinity of the lower surface of the protrusion 151b as much as possible, as shown in one embodiment described above. Accordingly, it is preferable that the heater portion 154a is not provided on the lower surface of the protrusion 151a and the heater portion 154b is not provided on the lower surface of the protrusion 151b.

Although in one embodiment described above, the force generating portions 152a and 152b are made of a shape-memory alloy, this is not limitative. For example, the force generating portions 152a and 152b may be made of, instead of the shape-memory alloy, a material having a higher coefficient of thermal expansion than the coefficient of thermal expansion of the material of the base layer 151. In more detail, a so-called bimetal (Bi-metallic strip) is applicable in which the base layer 151 is made of a material having a relatively low coefficient of thermal expansion such as silicon while the force generating portions 152a and 152b are made of a material having a relatively high coefficient of thermal expansion such as aluminum or nickel.

In such a configuration, a difference in expansion between the protrusions 151a and 151b and the force generating portions 152a and 152b due to the heat generation in the heater portions 154a and 154b causes the movable parts 15a and 15b to deform in a warping manner, thus causing a displacement of the free ends FT. Details of this operation will be given. The force generating portions 152a and 152b made of a material having a relatively high coefficient of expansion expands in accordance with the heating to generate force, and this force acts on the base layer 151 and the like so that the movable parts 15a and 15b are deformed in a warping manner. Here, in order to displace the free ends FT upward (in the +Z direction), it is necessary that the plurality of layers included in the movable parts 15a and 15b are laminated in the order reverse to that of one embodiment described above. In such a configuration adopting the bimetal, the force generating portions 152a and 152b can be formed by using an inexpensive material as compared with a case of using the shape-memory alloy. Therefore, a manufacturing cost of the actuator layer 15 can be reduced.

In one embodiment described above, the movable parts 15a and 15b are formed by the protrusions 151a and 151b, the force generating portions 152a and 152b, the insulating layer 153, and the heater portions 154a and 154b being laminated to one another, respectively. However, this is not limitative. For example, the insulating layer may be provided between the protrusions 151a and 151b and the force generating portions 152a and 152b, as long as the movable parts 15a and 15b have a structure in which a plurality of layers including the protrusions 151a and 151b, the force generating portions 152a and 152b, and the heater portions 154a and 154b are stacked. In one embodiment described above, each of the protrusions 151a and 151b, the force generating portions 152a and 152b, and the heater portions 154a and 154b has a layer shape. However, this is not limitative. For example, the movable parts 15a and 15b may adopt a structure in which the heater portions 154a and 154b have a certain degree of thickness, and a structure in which a plurality of portions including the protrusions 151a and 151b, the force generating portions 152a and 152b, and the heater portions 154a and 154b are stacked.

In one embodiment described above, the first and second parallel leaf springs 12 and 14 having a plate-like shape are adopted as a member for restricting movement of the lens group 20. However, this is not limitative. For example, various elastic members such as a helical spring are adoptable.

In one embodiment described above, an object (moving object) to be moved by the movable parts 15a and 15b is the lens group 20 serving as an optical system. However, this is not limitative. For example, the moving object may be other members such as the image-pickup element. For example, the image-pickup element layer may be moved in the Z direction by means of a configuration similar to the configuration for moving the lens group 20 in one embodiment described above, while a lens group 20B serving as the optical system for guiding a light from the photographic subject to the image-pickup element is fixed.

FIG. 29 illustrates a conceptual diagram showing one manner of moving an image-pickup element layer 18B back and forth in a direction along an optical axis Ax of the lens group 20B that is fixed. FIG. 29 shows an image-pickup part PBB that moves the image-pickup element layer 18B back and forth along the optical axis Ax. In this configuration, the image-pickup element layer 18B is moved back and forth along the optical axis Ax in accordance with an action of the actuator layer, to change the distance between the lens group 20B and the image-pickup element layer 18B, thereby achieving the auto-focus control. In this manner, the auto-focus control is achieved by moving at least one of the image-pickup element and the optical system in accordance with the bending deformation of the movable parts 15a and 15b. Thus, an imaging device including the actuator layer 15 allowing a control of the displacement of the movable parts 15a and 15b and configured to offer a high degree of freedom in designing is achieved.

The object (moving object) to be moved by the actuator is not limited to an element included in the imaging device, such as the optical system and the image-pickup element. For example, the moving object may be others such as an objective lens of an optical pick-up lens. That is, the present invention is applicable generally to an actuator and to a drive device having a moving object moved in accordance with a bending deformation of the actuator.

Needless to say, the whole or part of one embodiment described above and the whole or part of the various modifications can be appropriately combined so long as they are not mutually contradictory.

DESCRIPTION OF THE REFERENCE NUMERALS 15 actuator layer
15a, 15b movable part
18, 18B image-pickup element layer
20, 20B lens group
100 mobile phone
151 base layer
151a, 151b protrusion
152 actuator element layer
152a, 152b force generating portion
154 heater layer
154a, 154b heater portion
181 image-pickup element
310 focusing control section
500 camera module
600 current supply driver
700 electrical resistance detection section
800 contrast detection section

The invention claimed is:

1. An actuator comprising:
a movable part deformable in accordance with heat generation; and
a control section controlling the amount of deformation of said movable part,
wherein
said movable part is structured with a plurality of portions including a base portion, a force generating portion, and a heat generating portion being stacked, said force generating portion generating force in accordance with heating, said heat generating portion generating heat in accordance with a current supply, said force generating portion generating force in accordance with heating of said force generating portion due to heat generation of said heat generating portion which is caused in accordance with the current supply to said heat generating portion, so that said generated force causes deformation of said base portion, said force generating portion, and said heat generating portion to thereby deform said movable part,
an electrical resistance in said heat generating portion changes in accordance with deformation of said heat generating portion,
said control section controls the amount of deformation of said movable part by detecting the amount of deformation of said movable part based on the electrical resistance in said heat generating portion and making a control so as to supply to said heat generating portion a current necessary for obtaining a desired amount of deformation based on a result of the detection of the amount of deformation.

2. The actuator according to claim 1, wherein
said heat generating portion is provided in at least one of a first region and a second region, said first region being located between said base portion and said force generating portion, said second region being located at a side opposite to a side where said base portion exists relative to said force generating portion.

3. The actuator according to claim 1, wherein
said force generating portion contains a shape-memory alloy.

4. The actuator according to claim 1, wherein
said force generating portion has a higher coefficient of thermal expansion than a coefficient of thermal expansion of said base portion.

5. A drive device comprising:
the actuator according to claim 1; and
a moving object to be moved by the deformation of said movable part.

6. An imaging device comprising:
the actuator according to claim 1;
an image-pickup element; and
an optical system guiding a light from a photographic subject to said image-pickup element,
wherein at least one of said image-pickup element and said optical system is moved by the deformation of said movable part.

* * * * *